United States Patent
Keenan et al.

(10) Patent No.: US 9,481,752 B2
(45) Date of Patent: Nov. 1, 2016

(54) POLYMERIC PARTICLES COMPRISING VINYL FORMAL, VINYL ALCOHOL AND VINYL ACETATE MONOMER UNITS

(75) Inventors: Steve Keenan, Framingham, MA (US); Goldi Kaul, Framingham, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 1607 days.

(21) Appl. No.: 11/764,986

(22) Filed: Jun. 19, 2007

(65) Prior Publication Data

US 2008/0268058 A1 Oct. 30, 2008

Related U.S. Application Data

(60) Provisional application No. 60/820,504, filed on Jul. 27, 2006.

(51) Int. Cl.
*A61K 9/14* (2006.01)
*C08F 210/00* (2006.01)
*C08F 216/38* (2006.01)

(52) U.S. Cl.
CPC ........ *C08F 216/38* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 4,014,335 A * | 3/1977 | Arnold | 424/427 |
| 4,515,906 A | 5/1985 | Friesen et al. | |
| 4,629,464 A | 12/1986 | Takata et al. | |
| 4,897,255 A | 1/1990 | Fritzberg et al. | |
| 5,514,379 A | 5/1996 | Weissleder et al. | |
| 5,733,925 A | 3/1998 | Kunz et al. | |
| 6,368,658 B1 | 4/2002 | Schwarz et al. | |
| 7,311,861 B2 * | 12/2007 | Lanphere et al. | 264/7 |
| 7,501,179 B2 | 3/2009 | Song et al. | |
| 7,591,993 B2 | 9/2009 | Boschetti | |
| 2003/0185896 A1 | 10/2003 | Buiser et al. | |
| 2003/0203985 A1 | 10/2003 | Baldwin et al. | |
| 2003/0233150 A1 | 12/2003 | Bourne et al. | |
| 2004/0076582 A1 | 4/2004 | DiMatteo et al. | |
| 2004/0091543 A1 * | 5/2004 | Bell et al. | 424/489 |
| 2004/0096662 A1 | 5/2004 | Lanphere et al. | |
| 2004/0101564 A1 | 5/2004 | Rioux et al. | |
| 2005/0095428 A1 | 5/2005 | DiCarlo et al. | |
| 2005/0129775 A1 | 6/2005 | Lanphere et al. | |
| 2005/0196449 A1 | 9/2005 | DiCarlo et al. | |
| 2005/0238870 A1 | 10/2005 | Buiser et al. | |
| 2005/0263916 A1 | 12/2005 | Lanphere et al. | |
| 2006/0045900 A1 | 3/2006 | Richard et al. | |
| 2006/0116711 A1 | 6/2006 | Elliott et al. | |
| 2006/0199010 A1 | 9/2006 | DiCarlo et al. | |
| 2006/0247610 A1 | 11/2006 | Lanphere et al. | |
| 2007/0141099 A1 | 6/2007 | Buiser et al. | |
| 2007/0141340 A1 | 6/2007 | Song | |
| 2007/0142560 A1 | 6/2007 | Song et al. | |

FOREIGN PATENT DOCUMENTS

| | | | |
|---|---|---|---|
| CN | 1 561 964 | | 1/2005 |
| WO | 00/66183 | | 11/2000 |
| WO | 2004/014446 | | 2/2004 |
| WO | WO 2004/014446 | * | 2/2004 |
| WO | WO 2004/019999 | * | 3/2004 |

OTHER PUBLICATIONS

Vinylec® Resins Specifications, characterstics and packing—SPI Supplies.*
The product data sheet of SPI-Chem™ Vinylec® (Formvar®) Resins.*
The definition of pore from the Merriam Webster dictionary, accessed on Nov. 16, 2014.*
The definition of cavity from the Merriam Webster dictionary, accessed on Nov. 16, 2014.*

* cited by examiner

Primary Examiner — Tigabu Kassa

(57) ABSTRACT

Particles, such as particles including a polymer including vinyl formal monomer units, and related compositions and methods, are disclosed.

12 Claims, 13 Drawing Sheets

POLYMERIC PARTICLES COMPRISING VINYL FORMAL, VINYL ALCOHOL AND VINYL ACETATE MONOMER UNITS

CROSS-REFERENCE TO RELATED APPLICATION

This application claims priority under 35 U.S.C. §119 to U.S. Ser. No. 60/820,504, filed Jul. 27, 2006, the contents of which are hereby incorporated by reference.

FIELD

The disclosure relates to particles, such as particles including a polymer including vinyl formal monomer units, and to related compositions and methods.

BACKGROUND

Agents, such as therapeutic agents, can be delivered systemically, for example, by injection through the vascular system or oral ingestion, or they can be applied directly to a site where treatment is desired. In some cases, particles are used to deliver a therapeutic agent to a target site.

SUMMARY

In one aspect, the invention features a particle having a maximum dimension of 3,000 microns or less. The particle includes a polymer including more than 75 percent by weight vinyl formal monomer units.

In another aspect, the invention features a particle including a matrix and having a maximum dimension of 3,000 microns or less. The matrix includes a polymer including more than 75 percent by weight, and at most 85 percent by weight, vinyl formal monomer units. The matrix also includes at least one pore having a maximum dimension of from 0.01 micron to one micron. The particle includes a cavity that is defined by the matrix and that has a maximum dimension of from 10 microns to 1,000 microns.

In an additional aspect, the invention features a method including forming a particle having a maximum dimension of 3,000 microns or less. The particle includes a polymer including more than 75 percent by weight vinyl formal monomer units.

In a further aspect, the invention features a method of making a particle having a maximum dimension of 3,000 microns or less. The method includes forming a polymer including vinyl formal monomer units and forming the polymer including the vinyl formal monomer units into the particle.

In another aspect, the invention features a composition including a carrier fluid and a plurality of particles in the carrier fluid. At least some of the particles have a maximum dimension of 3,000 microns or less and include a polymer including more than 75 percent by weight vinyl formal monomer units.

Embodiments can also include one or more of the following.

The polymer can include vinyl formal monomer units. In some embodiments, the polymer can include more than 75 percent by weight (e.g., at least 76 percent by weight, at least 77 percent by weight, at least 78 percent by weight, at least 79 percent by weight, at least 80 percent by weight, at least 81 percent by weight, at least 82 percent by weight, at least 83 percent by weight, at least 84 percent by weight, at least 85 percent by weight, at least 90 percent by weight, at least 95 percent by weight), and/or at most 100 percent by weight (e.g., at most 95 percent by weight, at most 90 percent by weight, at most 85 percent by weight, at most 84 percent by weight, at most 83 percent by weight, at most 82 percent by weight, at most 81 percent by weight, at most 80 percent by weight, at most 79 percent by weight, at most 78 percent by weight, at most 77 percent by weight, at most 76 percent by weight) vinyl formal monomer units. In certain embodiments, the polymer can include from 80 percent by weight to 85 percent by weight vinyl formal monomer units. In some embodiments, the polymer can include 80 percent by weight vinyl formal monomer units. In certain embodiments, the polymer can include 81 percent by weight vinyl formal monomer units. In some embodiments, the polymer can include vinyl alcohol monomer units and/or vinyl acetate monomer units.

The particle can include at least one cavity and/or at least one pore. For example, the particle can include a plurality of cavities and/or pores. The particle can include at least one cavity (e.g., a plurality of cavities) having a maximum dimension of from 10 microns to 1,000 microns, and/or at least one pore (e.g., a plurality of pores) having a maximum dimension of from 0.01 micron to one micron. The particle can include a matrix including the polymer. The particle can include at least one cavity that is defined by the matrix including the polymer. The matrix can include at least one pore (e.g., a plurality of pores). The matrix can have a non-porous surface region.

The particle can include at least one therapeutic agent (e.g., at least one hydrophobic therapeutic agent, at least one hydrophilic therapeutic agent). The therapeutic agent can be micronized.

The particle can include at least two polymers that are different from each other. In some embodiments, the particle can include at least two polymers that are different from each other, but that each include vinyl formal monomer units. For example, the particle can include one polymer including 75 percent by weight vinyl formal monomer units, and another polymer including 81 percent by weight vinyl formal monomer units. The particle can include a therapeutic agent that is combined with at least one of the polymers.

Forming the particle can include generating a drop including a polymer. The polymer that is included in the drop can be the same as, or different from, the polymer that is included in the particle. The polymer that is included in the drop can include vinyl formal monomer units. In some embodiments, the polymer that is included in the drop can include a different weight percent of vinyl formal monomer units from the polymer that is included in the particle. In certain embodiments, the polymer that is included in the drop can include less than 75 percent by weight vinyl formal monomer units. Forming the particle can include forming the drop into the particle. The method may not include formalizing the polymer after generating the drop. The drop can include at least one therapeutic agent (e.g., at least one hydrophobic therapeutic agent, at least one hydrophilic therapeutic agent). The therapeutic agent can be micronized. Forming the drop into the particle can include contacting the drop with a solution including water and/or a surfactant. The method can include contacting the particle with a solution including a therapeutic agent. The drop can include a gelling precursor (e.g., alginate). Forming the drop into the particle can include contacting the drop with a gelling agent.

Embodiments can include one or more of the following advantages.

The particles can be relatively durable, and/or can exhibit relatively good abrasion resistance. This durability and/or abrasion resistance can, for example, help to limit or prevent damage to the particles during storage, delivery, and/or use. In some embodiments, the particles can be relatively flexible and/or compressible. This flexibility and/or compressibility can cause the particles to have good deliverability. For example, in certain embodiments, the particles can be relatively easily compressed into a catheter for delivery to a target site, and can assume their original size and/or shape when at the target site. In some embodiments in which the particles are relatively flexible, the flexibility of the particles can cause the particles to be adapted for use in many different environments.

The particles can exhibit relatively high compression strength and/or relatively little tackiness. In certain embodiments, particles having relatively high compression strength can exhibit good size and/or shape retention. This good size and/or shape retention can allow an operator (e.g., a physician) to use the particles to form a relatively precise embolization. For example, the operator can deliver the particles precisely to a target site, and/or can know in advance of the procedure approximately how many particles to deliver to the target site, since the particles can be unlikely to change substantially in size and/or shape. In some embodiments, particles having relatively little tackiness can exhibit better deliverability than particles having more tackiness. For example, particles with relatively little tackiness can be relatively unlikely to stick to the walls of a delivery device and/or to each other.

The particles can include a polymer having a relatively uniform distribution of vinyl formal monomer units. For example, the vinyl formal monomer units in the polymer can be formed by a solution state formalization method, which can case a relatively uniform degree of vinyl formal monomer units to form along the polymer chains. In some embodiments, particles including a polymer having a relatively uniform distribution of vinyl formal monomer units can exhibit relatively consistent and/or predictable properties.

The particles can be used to deliver one or more therapeutic agents to a target site effectively and efficiently, and/or to occlude a target site. The particles can be used to deliver one or more therapeutic agents to the same target site and/or to different target sites. For example, the particles can deliver one type of therapeutic agent (e.g., an anti-inflammatory) as the particles are being delivered to a target site, and another type of therapeutic agent (e.g., a chemotherapeutic agent) once the particles have reached the target site.

The particles can include (e.g., encapsulate) one or more hydrophobic therapeutic agents and/or one or more hydrophilic therapeutic agents. In some embodiments, the particles can be used to deliver one or more of the following therapeutic agents: proteins, DNA, RNA, genes, cells, growth hormone, and insulin. In certain embodiments in which the particles include at least one therapeutic agent, the process that is used to form the particles can have little or no effect on the therapeutic agent. In some embodiments, a particle including at least one therapeutic agent and a polymer including vinyl formal monomer units can be formed by incorporating the therapeutic agent into the polymer after the polymer has been formed. In certain embodiments, the resulting particle can include a relatively large volume of therapeutic agent. In some embodiments, a particle including a polymer including vinyl formal monomer units can be relatively hydrophobic. As the hydrophobicity of a particle increases, the ability of the particle to incorporate one or more hydrophobic therapeutic agents can also increase.

In certain embodiments in which the particles include one or more pores and/or cavities, the particles can be used to store and/or deliver one or more therapeutic agents. For example, a porous particle can be used to store one or more therapeutic agents in its pores.

The particles can be used to release one or more therapeutic agents at a specific time and/or over a period of time. In certain embodiments, a particle can include at least one cavity, which can be used to store and/or deliver a relatively large volume of therapeutic agent. The particles can be used to deliver a burst of therapeutic agent and/or to provide a controlled release of therapeutic agent over a period of time. In some embodiments, the particles can include a therapeutic agent that has been micronized. A micronized therapeutic agent can, for example, be relatively easily incorporated into a particle. In certain embodiments, after a micronized therapeutic agent has been released from a particle (e.g., at a target site), the micronized therapeutic agent can erode over a period of time. This erosion can provide a relatively continuous and/or uniform rate of therapeutic agent delivery into a target site.

The particles can release (e.g., elute) one or more therapeutic agents at a relatively uniform rate. For example, in some embodiments, the particles can include a matrix including a polymer including vinyl formal monomer units, and a therapeutic agent that is relatively uniformly distributed throughout the matrix. The relatively uniform distribution of the therapeutic agent throughout the matrix can, for example, result in a relatively uniform rate of therapeutic agent delivery from the particle (e.g., at a target site).

The particles can be used to deliver one or more chemotherapeutic agents to a target site in a body of a subject. In certain embodiments, chemotherapeutic methods that use the particles to deliver chemotherapeutic agents can have advantages over other chemotherapeutic methods. As an example, a patient who is treated with particles including a chemotherapeutic agent can exhibit a reduction in peak systemic blood plasma levels of the chemotherapeutic agent. This can, for example, lead to a reduction in side effects that may occur with use of the chemotherapeutic agent. As another example, particles including chemotherapeutic agents can deliver a relatively large amount of the chemotherapeutic agents locally to a target site. This localized delivery of a relatively large amount of chemotherapeutic agents to a target site can, for example, result in relatively targeted and/or concentrated chemotherapy which, in turn, can result in enhanced tumor response rates. As an additional example, the use of particles including one or more therapeutic agents at a target site can provide a subject with prolonged exposure to the chemotherapeutic agents, which can result in enhanced tumor response rates.

Features and advantages are in the description, drawings, and claims.

DETAILED DESCRIPTION

Figure 1A:
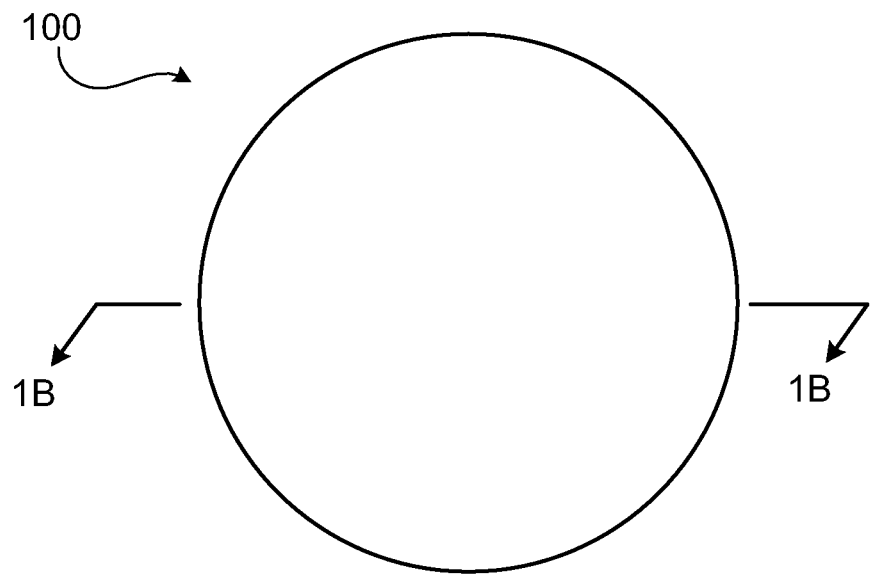
FIG. 1A is a side view of an embodiment of a particle.
Figure 1B:
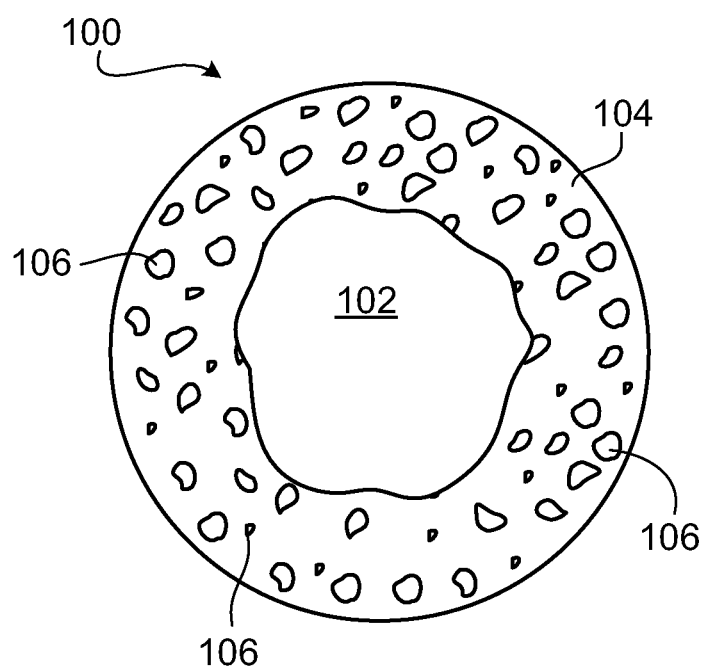
FIG. 1B is a cross-sectional view of the particle of FIG. 1A, taken along line 1B-1B.
Figure 2:
FIG. 2 is a scanning electron micrograph (SEM) image of the surface of a particle formed of a polymer including vinyl formal monomer units, taken at 551× magnification.
Figure 3:
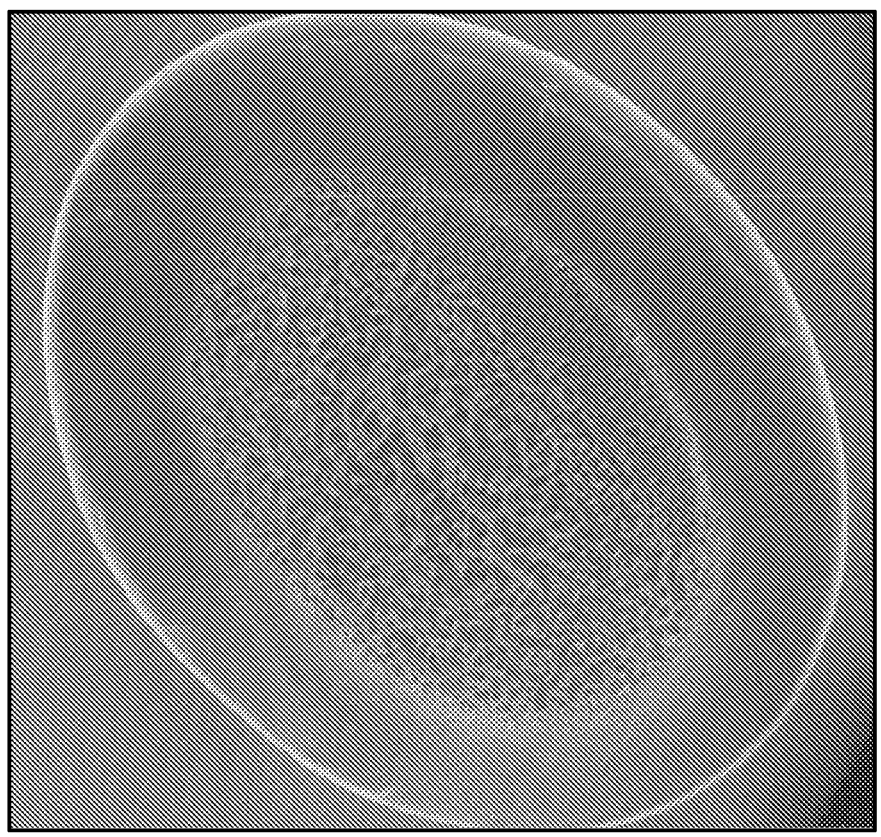
FIG. 3 is an SEM image of a partial cross-section of a particle formed of a polymer including vinyl formal monomer units, taken at 605× magnification.
Figure 4:
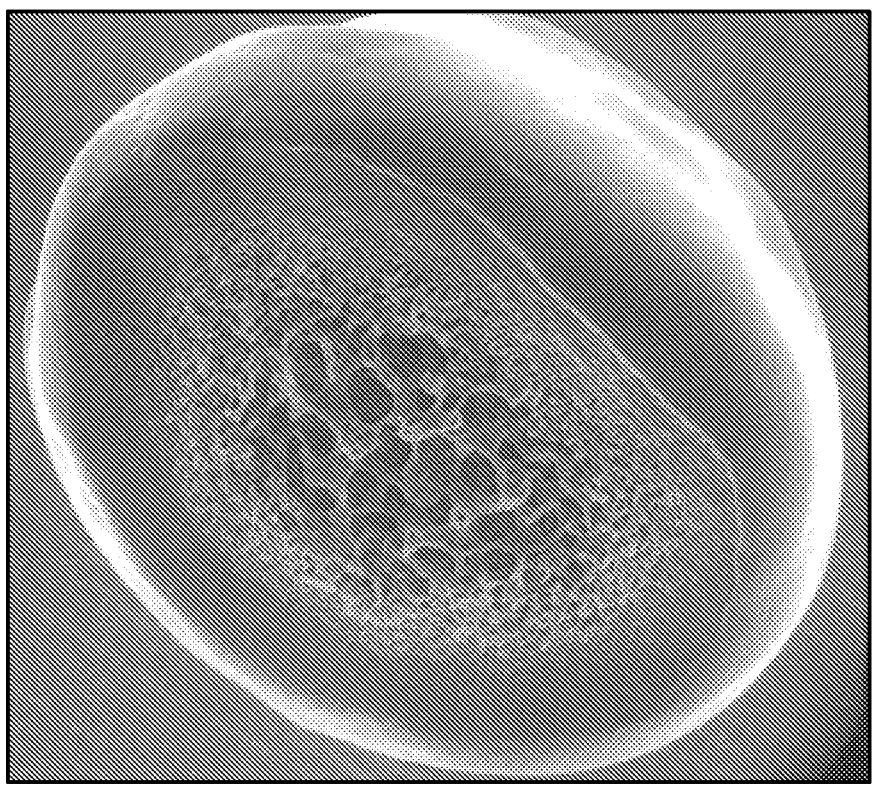
FIG. 4 is an SEM image of a partial cross-section of a particle formed of a polymer including vinyl formal monomer units, taken at 658× magnification.

FIGS. 1A and 1B show a particle 100 that can be used, for example, to deliver one or more therapeutic agents to a target site within a body of a subject. Particle 100 includes a cavity 102 surrounded by a matrix 104 including pores 106. The therapeutic agent(s) can be included on particle 100 and/or within particle 100 (e.g., within cavity 102, matrix 104, and/or pores 106). In some embodiments, the therapeutic agent(s) can be dispersed throughout particle 100. FIGS. 2-4 are scanning electron micrographs of an embodiment of a particle.

Matrix 104 of particle 100 is formed of a polymer including one or more vinyl formal monomer units. As referred to herein, a vinyl formal monomer unit has the following structure:

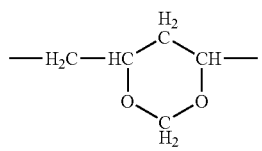

In certain embodiments, in addition to including one or more vinyl formal monomer units, the polymer out of which matrix 104 is formed can also include one or more vinyl alcohol monomer units. As referred to herein, a vinyl alcohol monomer unit has the following structure:

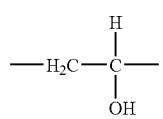

In some embodiments, in addition to including one or more vinyl formal monomer units and/or one or more vinyl alcohol monomer units, the polymer out of which matrix 104 is formed can also include one or more vinyl acetate monomer units. As referred to herein, a vinyl acetate monomer unit has the following structure:

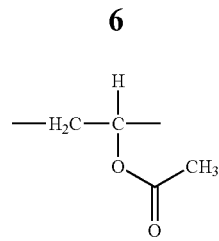

In embodiments in which matrix 104 is formed of a polymer including one or more vinyl formal monomer units, one or more vinyl alcohol monomer units, and/or one or more vinyl acetate monomer units, the monomer units generally can be arranged in a variety of different ways. As an example, in some embodiments, the polymer can include different monomer units that alternate with each other. For example, the polymer can include repeating blocks, each block including a vinyl formal monomer unit, a vinyl alcohol monomer unit, and a vinyl acetate monomer unit. As another example, in certain embodiments, the polymer can include blocks including multiple monomer units of the same type. For example, the polymer can include a block that is formed of multiple vinyl alcohol monomer units, connected to a block that is formed of multiple vinyl formal monomer units.

In some embodiments, the polymer out of which matrix 104 is formed can have the formula that is schematically represented below, in which x, y, and z each are integers that are greater than zero. The individual monomer units that are shown can be directly attached to each other, and/or can include one or more other monomer units (e.g., vinyl formal monomer units, vinyl alcohol monomer units, vinyl acetate monomer units) between them:

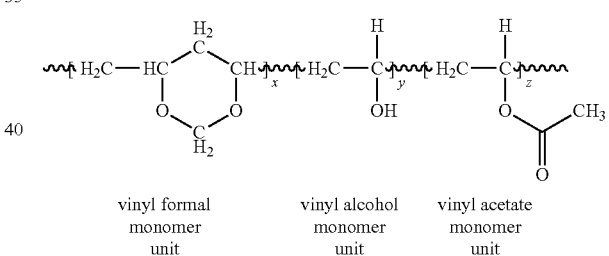

vinyl formal monomer unit     vinyl alcohol monomer unit     vinyl acetate monomer unit Examples of commercially available polymers including vinyl formal monomer units include the Vinylec® (formerly known as Formvar®) resins, available from SPI Supplies® (West Chester, Pa.). Vinylec® is a registered trade name for a family of copolymers including vinyl formal monomer units, vinyl alcohol monomer units, and vinyl acetate monomer units. A Vinylec® polymer includes 81 percent by weight vinyl formal monomer units, from 9.5 percent by weight to 13.0 percent by weight vinyl acetate monomer units, and from 5.0 percent by weight to 6.5 percent by weight vinyl alcohol monomer units. Different grades of Vinylec® polymers include Vinylec® E (previously Formvar® 15/95E), Vinylec® H (previously Formvar® 7/95E), Vinylec® L (previously Formvar® 6/95E), and Vinylec® K (previously Formvar® 5/95E).

Typically, as the weight percent of vinyl formal monomer units in a polymer increases, the hydrophobicity of a particle that is formed of the polymer can also increase. As the hydrophobicity of a particle increases, the particle can exhibit an enhanced ability to incorporate a hydrophobic therapeutic agent. As a result, the particle may be able to incorporate and/or deliver a relatively high volume of hydrophobic therapeutic agents. In certain embodiments, the weight percent of vinyl formal monomer units in a polymer used to form a particle can increase when the polymer is formalized prior to particle formation (e.g., while the polymer is in the solution state), rather than during and/or after particle formation. Without wishing to be bound by theory, it is believed that a polymer that is formalized prior to particle formation can include a higher number of polymer chains that are exposed to formalizing reactants during the formalization process, as compared to a polymer that is formalized during and/or after incorporation of the polymer into a particle.

In some embodiments, a polymer can include at least 60 percent by weight (e.g., at least 65 percent by weight, at least 70 percent by weight, at least 71 percent by weight, at least 72 percent by weight, at least 73 percent by weight, at least 74 percent by weight, at least 75 percent by weight, at least 76 percent by weight, at least 77 percent by weight, at least 78 percent by weight, at least 79 percent by weight, at least 80 percent by weight, at least 85 percent by weight, at least 90 percent by weight, at least 95 percent by weight), and/or at most 100 percent by weight (e.g., at most 95 percent by weight, at most 90 percent by weight, at most 85 percent by weight, at most 80 percent by weight, at most 79 percent by formic acid, phosphoric acid) to form water and a section of a polymer including one vinyl formal monomer unit:

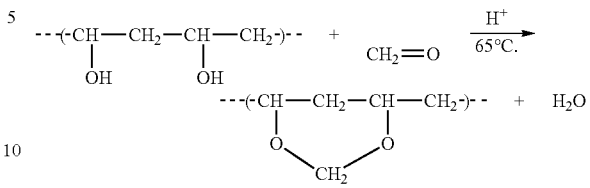

In embodiments in which the above process is used to form the polymer, the polymer can be substantially devoid of vinyl acetate monomer units (e.g., the polymer can contain less than 0.1 percent by weight vinyl acetate monomer units).

In certain embodiments in which the above process is used to form the polymer, some hydroxyl groups may not react with adjacent groups and may remain unconverted.

In some embodiments, an embodiment of a polymer including one or more vinyl formal monomer units can be formed by the following mechanism, in which n, x, y, and z each are integers that are greater than zero:

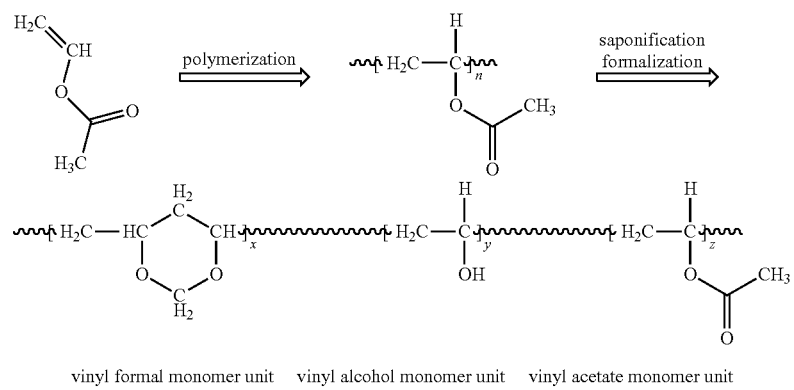

vinyl formal monomer unit    vinyl alcohol monomer unit    vinyl acetate monomer unit weight, at most 78 percent by weight, at most 77 percent by weight, at most 76 percent by weight, at most 75 percent by weight, at most 74 percent by weight, at most 73 percent by weight, at most 72 percent by weight, at most 71 percent by weight, at most 70 percent by weight, at most 65 percent by weight) vinyl formal monomer units. In certain embodiments, a polymer can include more than 75 percent by weight vinyl formal monomer units. In some embodiments, a polymer can include 80 percent by weight vinyl formal monomer units. In certain embodiments, a polymer can include 81 percent by weight vinyl formal monomer units. As used herein, the weight percent of vinyl formal monomer units in a polymer is measured using solid-state NMR spectroscopy, such as solid-state $^{13}C$ NMR spectroscopy employing variable amplitude cross-polarization with high-power proton decoupling and magnetic angle spinning (VACP-MAS).

In some embodiments, a polymer including one or more vinyl formal monomer units can be formed using the following 1,3-acetalization process. As shown below, a section of a polymer including two vinyl alcohol monomer units is reacted with formaldehyde in the presence of an acid (e.g., sulfuric acid, hydrochloric acid, nitric acid, acetic acid, As noted above, particle 100 includes a cavity 102 surrounded by a matrix 104 including pores 106. For a given particle, a cavity occupies at least 30 percent by volume of the particle, and a pore occupies less than one percent by volume of the particle.

The presence of cavity 102 and pores 106 in particle 100 can enhance the ability of particle 100 to retain and/or deliver a relatively large volume of therapeutic agent. As an example, in some embodiments, cavity 102 can be used to store a relatively large volume of therapeutic agent, and/or pores 106 can be used to deliver the relatively large volume of therapeutic agent into a target site within a body of a subject at a controlled rate. As another example, in certain embodiments, both cavity 102 and pores 106 can be used to store and/or deliver one or more therapeutic agents. In some embodiments, cavity 102 can contain one type of therapeutic agent, while pores 106 contain a different type of therapeutic agent.

Generally, as the size of cavity 102 in particle 100 increases, the volume of therapeutic agent retained by particle 100 can increase. In some embodiments, cavity 102 can have a maximum dimension of at least one micron (e.g., a least five microns, at least 10 microns, at least 25 microns, at least 50 microns, at least 100 microns, at least 250 microns, at least 500 microns, at least 750 microns) and/or at most 1,000 microns (e.g., at most 750 microns, at most 500 microns, at most 250 microns, at most 100 microns, at most 50 microns, at most 25 microns, at most 10 microns, at most five microns). While particle 100 is shown as having one cavity 102, in certain embodiments, a particle can include more than one cavity (e.g., two cavities, three cavities, four cavities, five cavities).

Typically, as the sizes of pores 106 increase, the volume of therapeutic agent retained by particle 100 can increase. In certain embodiments, one or more pores 106 can have a maximum dimension of at least 0.01 micron (e.g., at least 0.05 micron, at least 0.1 micron, at least 0.5 micron, at least one micron, at least five microns, at least 10 microns, at least 15 microns, at least 20 microns, at least 25 microns, at least 30 microns, at least 35 microns, at least 50 microns, at least 100 microns, at least 150 microns, at least 200 microns, at least 250 microns), and/or at most 300 microns (e.g., at most 250 microns, at most 200 microns, at most 150 microns, at most 100 microns, at most 50 microns, at most 35 microns, at most 30 microns, at most 25 microns, at most 20 microns, at most 15 microns, at most 10 microns, at most five microns, at most one micron, at most 0.5 micron, at most 0.1 micron, at most 0.05 micron). In some embodiments, some or all of pores 106 can have a maximum dimension of from 0.01 micron to one micron, and/or some or all of pores 106 can have a maximum dimension of from 10 microns to 300 microns (e.g., from 100 microns to 300 microns). As used herein, pore size is measured using mercury porosimetry.

While FIG. 1B shows a particle with pores having different sizes, in some embodiments, a particle can include pores that have the same size (e.g., that have the same maximum dimension).

As described above, particle 100 can be used to deliver one or more therapeutic agents (e.g., a combination of therapeutic agents) to a target site. Therapeutic agents include genetic therapeutic agents, non-genetic therapeutic agents, and cells, and can be negatively charged, positively charged, amphoteric, or neutral. Therapeutic agents can be, for example, materials that are biologically active to treat physiological conditions; pharmaceutically active compounds; proteins; gene therapies; nucleic acids with and without carrier vectors (e.g., recombinant nucleic acids, DNA (e.g., naked DNA), cDNA, RNA, genomic DNA, cDNA or RNA in a non-infectious vector or in a viral vector which may have attached peptide targeting sequences, antisense nucleic acids (RNA, DNA)); oligonucleotides; gene/vector systems (e.g., anything that allows for the uptake and expression of nucleic acids); DNA chimeras (e.g., DNA chimeras which include gene sequences and encoding for ferry proteins such as membrane translocating sequences ("MTS") and herpes simplex virus-1 ("VP22")); compacting agents (e.g., DNA compacting agents); viruses; polymers; hyaluronic acid; proteins (e.g., enzymes such as ribozymes, asparaginase); immunologic species; nonsteroidal anti-inflammatory medications; oral contraceptives; progestins; gonadotrophin-releasing hormone agonists; chemotherapeutic agents; and radioactive species (e.g., radioisotopes, radioactive molecules). Non-limiting examples of therapeutic agents include anti-thrombogenic agents; thrombogenic agents; agents that promote clotting; agents that inhibit clotting; antioxidants; angiogenic and anti-angiogenic agents and factors; anti-proliferative agents (e.g., agents capable of blocking smooth muscle cell proliferation, such as rapamycin); calcium entry blockers (e.g., verapamil, diltiazem, nifedipine); targeting factors (e.g., polysaccharides, carbohydrates); agents that can stick to the vasculature (e.g., charged moieties); and survival genes which protect against cell death (e.g., anti-apoptotic Bcl-2 family factors and Akt kinase).

Examples of agents that can stick to the vasculature include sialyated glycans, which selectively bind to selectins (adhesion molecules expressed in vertebrate circulatory cells, such as endothelial cells and blood cells). Other examples of selectin-binding ligands include the glycosylation-dependent cell adhesion molecule 1 (GlyCAM-1), hematopoietic progenitor cell antigen CD34, mucosal vascular addressin cell adhesion molecule (MAdCAM-1), tetrasaccahrides (e.g., Sialyl-Lewis$^x$), Sialyl-Lewis Cutaneous lymphocyte-associated antigen, and Sialyl-Lewis$^x$ P-selectin glycoprotein ligand-1. Additional examples of agents that can stick to the vasculature include ligands that bind to integrin receptors in, for example, platelets, leukocytes, thymocytes, macrophages, endothelial cells, and fibroblasts. Examples of these ligands include fibronectin, laminin, vitronectin, osteopontin, von Willebrand's factor, PE-CAM-1, fibrinogen, human L1 thrombospondin, collagen, tenascin, VCAM-1, ICAM-1, ICAM-2, ICAM-3, and E-Cadherin. In certain embodiments, a particle can include integrin-receptor binding ligands on its surface. Further examples of agents that can stick to the vasculature are RGD-peptides. In some embodiments, a particle can include RGD-peptides that are covalently attached to the surface of the particle. These RGD-peptides can cause cells to adhere to the surface of the particle. Additional examples of agents that can stick to the vasculature are collagen and antigens that are specific to immunoglobulins in the vasculature. As an example, in certain embodiments, a particle can include a coating that is formed of collagen. The collagen coating can, for example, promote thrombus formation and/or result in non-mobile emboli being formed at a relatively fast rate at a target site. As another example, in some embodiments, a particle can include antigens that are attached to its surface. The antigens can be specific to immunoglobulins in the vasculature, and can promote adhesion of the particles at the molecular level.

Examples of non-genetic therapeutic agents include: anti-thrombotic agents such as heparin, heparin derivatives, urokinase, and PPack (dextrophenylalanine proline arginine chloromethylketone); anti-inflammatory agents such as dexamethasone, prednisolone, corticosterone, budesonide, estrogen, acetyl salicylic acid, sulfasalazine and mesalamine; antineoplastic/antiproliferative/anti-mitotic agents such as paclitaxel, 5-fluorouracil, cisplatin, methotrexate, doxorubicin, vinblastine, vincristine, epothilones, endostatin, angiostatin, angiopeptin, monoclonal antibodies capable of blocking smooth muscle cell proliferation, and thymidine kinase inhibitors; anesthetic agents such as lidocaine, bupivacaine and ropivacaine; anti-coagulants such as D-Phe-Pro-Arg chloromethyl ketone, an RGD peptide-containing compound, heparin, hirudin, antithrombin compounds, platelet receptor antagonists, anti-thrombin antibodies, anti-platelet receptor antibodies, aspirin, prostaglandin inhibitors, platelet inhibitors and tick antiplatelet factors or peptides; vascular cell growth promoters such as growth factors, transcriptional activators, and translational promoters; vascular cell growth inhibitors such as growth factor inhibitors (e.g., PDGF inhibitor-Trapidil), growth factor receptor antagonists, transcriptional repressors, translational repressors, replication inhibitors, inhibitory antibodies, antibodies directed against growth factors, bifunctional molecules consisting of a growth factor and a cytotoxin, bifunctional molecules consisting of an antibody and a cytotoxin; protein kinase and tyrosine kinase inhibitors (e.g., tyrphostins, genistein, quinoxalines); prostacyclin analogs; cholesterol-lowering agents; angiopoietins; antimicrobial agents such as triclosan, cephalosporins, aminoglycosides and nitrofurantoin; cytotoxic agents, cytostatic agents and cell proliferation affectors; vasodilating agents; and agents that interfere with endogenous vasoactive mechanisms.

Examples of genetic therapeutic agents include: anti-sense DNA and RNA; DNA coding for anti-sense RNA, tRNA or rRNA to replace defective or deficient endogenous molecules, angiogenic factors including growth factors such as acidic and basic fibroblast growth factors, vascular endothelial growth factor, epidermal growth factor, transforming growth factor α and β, platelet-derived endothelial growth factor, platelet-derived growth factor, tumor necrosis factor a, hepatocyte growth factor, and insulin like growth factor, cell cycle inhibitors including CD inhibitors, thymidine kinase ("TK") and other agents useful for interfering with cell proliferation, and the family of bone morphogenic proteins ("BMP's"), including BMP2, BMP3, BMP4, BMP5, BMP6 (Vgr1), BMP7 (OP1), BMP8, BMP9, BMP10, BM11, BMP12, BMP13, BMP14, BMP15, and BMP16. Currently preferred BMP's are any of BMP2, BMP3, BMP4, BMP5, BMP6 and BMP7. These dimeric proteins can be provided as homodimers, heterodimers, or combinations thereof, alone or together with other molecules. Alternatively or additionally, molecules capable of inducing an upstream or downstream effect of a BMP can be provided. Such molecules include any of the "hedgehog" proteins, or the DNA's encoding them. Vectors of interest for delivery of genetic therapeutic agents include: plasmids; viral vectors such as adenovirus (AV), adenoassociated virus (AAV) and lentivirus; and non-viral vectors such as lipids, liposomes and cationic lipids.

Cells include cells of human origin (autologous or allogeneic), including stem cells, or from an animal source (xenogeneic), which can be genetically engineered if desired to deliver proteins of interest.

Several of the above and numerous additional therapeutic agents are disclosed in Kunz et al., U.S. Pat. No. 5,733,925, which is incorporated herein by reference. Therapeutic agents disclosed in this patent include the following:

"Cytostatic agents" (i.e., agents that prevent or delay cell division in proliferating cells, for example, by inhibiting replication of DNA or by inhibiting spindle fiber formation). Representative examples of cytostatic agents include modified toxins, methotrexate, adriamycin, radionuclides (e.g., such as disclosed in Fritzberg et al., U.S. Pat. No. 4,897,255), protein kinase inhibitors, including staurosporin, a protein kinase C inhibitor of the following formula:

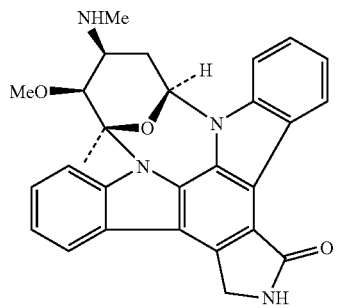 [SMILES: CN[C@H]1C[C@H]2O[C@@](C)([C@H]1OC)n1c3ccccc3c3c4c(c5c6ccccc6n2c5c31)C(=O)NC4]

as well as diindoloalkaloids having one of the following general structures:

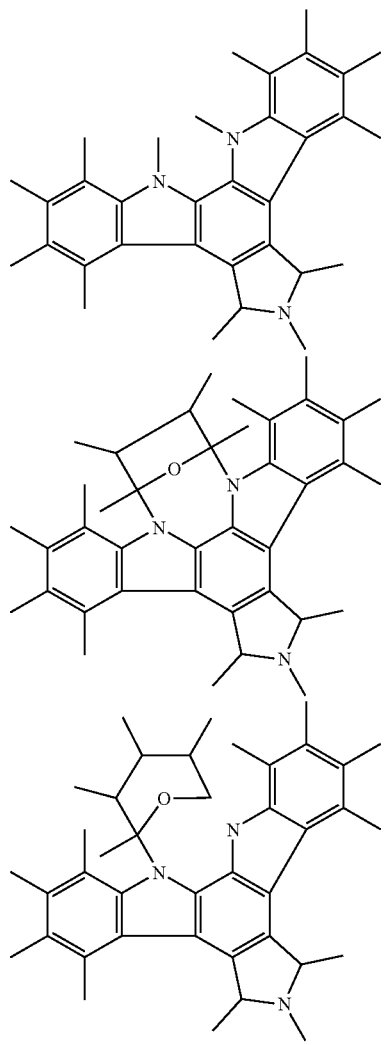

as well as stimulators of the production or activation of TGF-beta, including Tamoxifen and derivatives of functional equivalents (e.g., plasmin, heparin, compounds capable of reducing the level or inactivating the lipoprotein Lp(a) or the glycoprotein apolipoprotein(a)) thereof, TGF-beta or functional equivalents, derivatives or analogs thereof, suramin, nitric oxide releasing compounds (e.g., nitroglycerin) or analogs or functional equivalents thereof, paclitaxel or analogs thereof (e.g., taxotere), inhibitors of specific enzymes (such as the nuclear enzyme DNA topoisomerase II and DNA polymerase, RNA polymerase, adenyl guanyl cyclase), superoxide dismutase inhibitors, terminal deoxynucleotidyl-transferase, reverse transcriptase, antisense oligonucleotides that suppress smooth muscle cell proliferation and the like. Other examples of "cytostatic agents" include peptidic or mimetic inhibitors (i.e., antagonists, agonists, or competitive or non-competitive inhibitors) of cellular factors that may (e.g., in the presence of extracellular matrix) trigger proliferation of smooth muscle cells or pericytes: e.g., cytokines (e.g., interleukins such as IL-1), growth factors (e.g., PDGF, TGF-alpha or -beta, tumor necrosis factor, smooth muscle- and endothelial-derived growth factors, i.e., endothelin, FGF), homing receptors (e.g., for platelets or leukocytes), and extracellular matrix receptors (e.g., integrins). Representative examples of useful therapeutic agents in this category of cytostatic agents addressing smooth muscle proliferation include: sub fragments of heparin, triazolopyrimidine (trapidil; a PDGF antagonist), lovastatin, and prostaglandins E1 or I2.

Agents that inhibit the intracellular increase in cell volume (i.e., the tissue volume occupied by a cell), such as cytoskeletal inhibitors or metabolic inhibitors. Representative examples of cytoskeletal inhibitors include colchicine, vinblastin, cytochalasins, paclitaxel and the like, which act on microtubule and microfilament networks within a cell. Representative examples of metabolic inhibitors include staurosporin, trichothecenes, and modified diphtheria and ricin toxins, Pseudomonas exotoxin and the like. Trichothecenes include simple trichothecenes (i.e., those that have only a central sesquiterpenoid structure) and macrocyclic trichothecenes (i.e., those that have an additional macrocyclic ring), e.g. a verrucarins or roridins, including Verrucarin A, Verrucarin B, Verrucarin J (Satratoxin C), Roridin A, Roridin C, Roridin D, Roridin E (Satratoxin D), Roridin H.

Agents acting as an inhibitor that blocks cellular protein synthesis and/or secretion or organization of extracellular matrix (i.e., an "anti-matrix agent"). Representative examples of "anti-matrix agents" include inhibitors (i.e., agonists and antagonists and competitive and non-competitive inhibitors) of matrix synthesis, secretion and assembly, organizational cross-linking (e.g., transglutaminases cross-linking collagen), and matrix remodeling (e.g., following wound healing). A representative example of a useful therapeutic agent in this category of anti-matrix agents is colchicine, an inhibitor of secretion of extracellular matrix. Another example is tamoxifen for which evidence exists regarding its capability to organize and/or stabilize as well as diminish smooth muscle cell proliferation following angioplasty. The organization or stabilization may stem from the blockage of vascular smooth muscle cell maturation in to a pathologically proliferating form.

Agents that are cytotoxic to cells, particularly cancer cells. Preferred agents are Roridin A, Pseudomonas exotoxin and the like or analogs or functional equivalents thereof. A plethora of such therapeutic agents, including radioisotopes and the like, have been identified and are known in the art. In addition, protocols for the identification of cytotoxic moieties are known and employed routinely in the art.

A number of the above therapeutic agents and several others have also been identified as candidates for vascular treatment regimens, for example, as agents targeting restenosis. Such agents include one or more of the following: calcium-channel blockers, including benzothiazapines (e.g., diltiazem, clentiazem); dihydropyridines (e.g., nifedipine, amlodipine, nicardapine); phenylalkylamines (e.g., verapamil); serotonin pathway modulators, including 5-HT antagonists (e.g., ketanserin, naftidrofuryl) and 5-HT uptake inhibitors (e.g., fluoxetine); cyclic nucleotide pathway agents, including phosphodiesterase inhibitors (e.g., cilostazole, dipyridamole), adenylate/guanylate cyclase stimulants (e.g., forskolin), and adenosine analogs; catecholamine modulators, including α-antagonists (e.g., prazosin, bunazosine), β-antagonists (e.g., propranolol), and α/β-antagonists (e.g., labetalol, carvedilol); endothelin receptor antagonists; nitric oxide donors/releasing molecules, including organic nitrates/nitrites (e.g., nitroglycerin, isosorbide dinitrate, amyl nitrite), inorganic nitroso compounds (e.g., sodium nitroprusside), sydnonimines (e.g., molsidomine, linsidomine), nonoates (e.g., diazenium diolates, NO adducts of alkanediamines), S-nitroso compounds, including low molecular weight compounds (e.g., S-nitroso derivatives of captopril, glutathione and N-acetyl penicillamine) and high molecular weight compounds (e.g., S-nitroso derivatives of proteins, peptides, oligosaccharides, polysaccharides, synthetic polymers/oligomers and natural polymers/oligomers), C-nitroso-, O-nitroso- and N-nitroso-compounds, and L-arginine; ACE inhibitors (e.g., cilazapril, fosinopril, enalapril); ATII-receptor antagonists (e.g., saralasin, losartin); platelet adhesion inhibitors (e.g., albumin, polyethylene oxide); platelet aggregation inhibitors, including aspirin and thienopyridine (ticlopidine, clopidogrel) and GP IIb/IIIa inhibitors (e.g., abciximab, epitifibatide, tirofiban, intergrilin); coagulation pathway modulators, including heparinoids (e.g., heparin, low molecular weight heparin, dextran sulfate, β-cyclodextrin tetradecasulfate), thrombin inhibitors (e.g., hirudin, hirulog, PPACK (D-phe-L-propyl-L-arg-chloromethylketone), argatroban), Fxa inhibitors (e.g., antistatin, TAP (tick anticoagulant peptide)), vitamin K inhibitors (e.g., warfarin), and activated protein C; cyclooxygenase pathway inhibitors (e.g., aspirin, ibuprofen, flurbiprofen, indomethacin, sulfinpyrazone); natural and synthetic corticosteroids (e.g., dexamethasone, prednisolone, methprednisolone, hydrocortisone); lipoxygenase pathway inhibitors (e.g., nordihydroguairetic acid, caffeic acid; leukotriene receptor antagonists; antagonists of E- and P-selectins; inhibitors of VCAM-1 and ICAM-1 interactions; prostaglandins and analogs thereof, including prostaglandins such as PGE1 and PGI2; prostacyclins and prostacyclin analogs (e.g., ciprostene, epoprostenol, carbacyclin, iloprost, beraprost); macrophage activation preventers (e.g., bisphosphonates); HMG-CoA reductase inhibitors (e.g., lovastatin, pravastatin, fluvastatin, simvastatin, cerivastatin); fish oils and omega-3-fatty acids; free-radical scavengers/antioxidants (e.g., probucol, vitamins C and E, ebselen, retinoic acid (e.g., trans-retinoic acid), SOD mimics); agents affecting various growth factors including FGF pathway agents (e.g., bFGF antibodies, chimeric fusion proteins), PDGF receptor antagonists (e.g., trapidil), IGF pathway agents (e.g., somatostatin analogs such as angiopeptin and ocreotide), TGF-β pathway agents such as polyanionic agents (heparin, fucoidin), decorin, and TGF-β antibodies, EGF pathway agents (e.g., EGF antibodies, receptor antagonists, chimeric fusion proteins), TNF-α pathway agents (e.g., thalidomide and analogs thereof), thromboxane A2 (TXA2) pathway modulators (e.g., sulotroban, vapiprost, dazoxiben, ridogrel), protein tyrosine kinase inhibitors (e.g., tyrphostin, genistein, and quinoxaline derivatives); MMP pathway inhibitors (e.g., marimastat, ilomastat, metastat), and cell motility inhibitors (e.g., cytochalasin B); antiproliferative/antineoplastic agents including antimetabolites such as purine analogs (e.g., 6-mercaptopurine), pyrimidine analogs (e.g., cytarabine and 5-fluorouracil) and methotrexate, nitrogen mustards, alkyl sulfonates, ethylenimines, antibiotics (e.g., daunorubicin, doxorubicin, daunomycin, bleomycin, mitomycin, penicillins, cephalosporins, ciprofalxin, vancomycins, aminoglycosides, quinolones, polymyxins, erythromycins, tertacyclines, chloramphenicols, clindamycins, linomycins, sulfonamides, and their homologs, analogs, fragments, derivatives, and pharmaceutical salts), nitrosoureas (e.g., carmustine, lomustine) and cisplatin, agents affecting microtubule dynamics (e.g., vinblastine, vincristine, colchicine, paclitaxel, epothilone), caspase activators, proteasome inhibitors, angiogenesis inhibitors (e.g., endostatin, angiostatin and squalamine), and rapamycin, cerivastatin, flavopiridol and suramin; matrix deposition/organization pathway inhibitors (e.g., halofuginone or other quinazolinone derivatives, tranilast); endothelialization facilitators (e.g., VEGF and RGD peptide); and blood rheology modulators (e.g., pentoxifylline).

Other examples of therapeutic agents include anti-tumor agents, such as docetaxel, alkylating agents (e.g., mechlorethamine, chlorambucil, cyclophosphamide, melphalan, ifosfamide), plant alkaloids (e.g., etoposide), inorganic ions (e.g., cisplatin), biological response modifiers (e.g., interferon), and hormones (e.g., tamoxifen, flutamide), as well as their homologs, analogs, fragments, derivatives, and pharmaceutical salts.

Additional examples of therapeutic agents include organic-soluble therapeutic agents, such as mithramycin, cyclosporine, and plicamycin. Further examples of therapeutic agents include pharmaceutically active compounds, anti-sense genes, viral, liposomes and cationic polymers (e.g., selected based on the application), biologically active solutes (e.g., heparin), prostaglandins, prostcyclins, L-arginine, nitric oxide (NO) donors (e.g., lisidomine, molsidomine, NO-protein adducts, NO-polysaccharide adducts, polymeric or oligomeric NO adducts or chemical complexes), enoxaparin, Warafin sodium, dicumarol, interferons, interleukins, chymase inhibitors (e.g., Tranilast), ACE inhibitors (e.g., Enalapril), serotonin antagonists, 5-HT uptake inhibitors, and beta blockers, and other antitumor and/or chemotherapy drugs, such as BiCNU, busulfan, carboplatinum, cisplatinum, cytoxan, DTIC, fludarabine, mitoxantrone, velban, VP-16, herceptin, leustatin, navelbine, rituxan, and taxotere.

In some embodiments, a therapeutic agent can be hydrophilic. An example of a hydrophilic therapeutic agent is doxorubicin hydrochloride. In certain embodiments, a therapeutic agent can be hydrophobic. Examples of hydrophobic therapeutic agents include paclitaxel, cisplatin, tamoxifen, and doxorubicin base.

Therapeutic agents are described, for example, in DiMatteo et al., U.S. Patent Application Publication No. US 2004/0076582 A1, published on Apr. 22, 2004, and entitled "Agent Delivery Particle"; Schwarz et al., U.S. Pat. No. 6,368,658; Buiser et al., U.S. patent application Ser. No. 11/311,617, filed on Dec. 19, 2005, and entitled "Coils"; and Song, U.S. patent application Ser. No. 11/355,301, filed on Feb. 15, 2006, and entitled "Block Copolymer Particles", all of which are incorporated herein by reference.

In certain embodiments, in addition to or as an alternative to including therapeutic agents, particle 100 can include one or more radiopaque materials, materials that are visible by magnetic resonance imaging (MRI-visible materials), ferromagnetic materials, and/or contrast agents (e.g., ultrasound contrast agents). Radiopaque materials, MRI-visible materials, ferromagnetic materials, and contrast agents are described, for example, in Rioux et al., U.S. Patent Application Publication No. US 2004/0101564 A1, published on May 27, 2004, and entitled "Embolization", which is incorporated herein by reference.

In general, particle 100 can have a maximum dimension of 3,000 microns or less (e.g., from two microns to 3,000 microns; from 10 microns to 3,000 microns; from 40 microns to 2,000 microns; from 100 microns to 700 microns; from 500 microns to 700 microns; from 100 microns to 500 microns; from 100 microns to 300 microns; from 300 microns to 500 microns; from 500 microns to 1,200 microns; from 500 microns to 700 microns; from 700 microns to 900 microns; from 900 microns to 1,200 microns; from 1,000 microns to 1,200 microns). In some embodiments, particle 100 can have a maximum dimension of 3,000 microns or less (e.g., 2,500 microns or less; 2,000 microns or less; 1,500 microns or less; 1,200 microns or less; 1,150 microns or less; 1,100 microns or less; 1,050 microns or less; 1,000 microns or less; 900 microns or less; 700 microns or less; 500 microns or less; 400 microns or less; 300 microns or less; 100 microns or less; 50 microns or less; 10 microns or less; five microns or less) and/or one micron or more (e.g., five microns or more; 10 microns or more; 50 microns or more; 100 microns or more; 300 microns or more; 400 microns or more; 500 microns or more; 700 microns or more; 900 microns or more; 1,000 microns or more; 1,050 microns or more; 1,100 microns or more; 1,150 microns or more; 1,200 microns or more; 1,500 microns or more; 2,000 microns or more; 2,500 microns or more). In some embodiments, particle 100 can have a maximum dimension of less than 100 microns (e.g., less than 50 microns).

In some embodiments, particle 100 can be substantially spherical. In certain embodiments, particle 100 can have a sphericity of 0.8 or more (e.g., 0.85 or more, 0.9 or more, 0.95 or more, 0.97 or more). Particle 100 can be, for example, manually compressed, essentially flattened, while wet to 50 percent or less of its original maximum dimension and then, upon exposure to fluid, regain a sphericity of 0.8 or more (e.g., 0.85 or more, 0.9 or more, 0.95 or more, 0.97 or more). The sphericity of a particle can be determined using a Beckman Coulter RapidVUE Image Analyzer version 2.06 (Beckman Coulter, Miami, Fla.). Briefly, the RapidVUE takes an image of continuous-tone (gray-scale) form and converts it to a digital form through the process of sampling and quantization. The system software identifies and measures particles in an image in the form of a fiber, rod or sphere. The sphericity of a particle, which is computed as Da/Dp (where Da=$\sqrt{(4A/\pi)}$; Dp=P/$\pi$; A=pixel area; P=pixel perimeter), is a value from zero to one, with one representing a perfect circle.

Figure 5A:
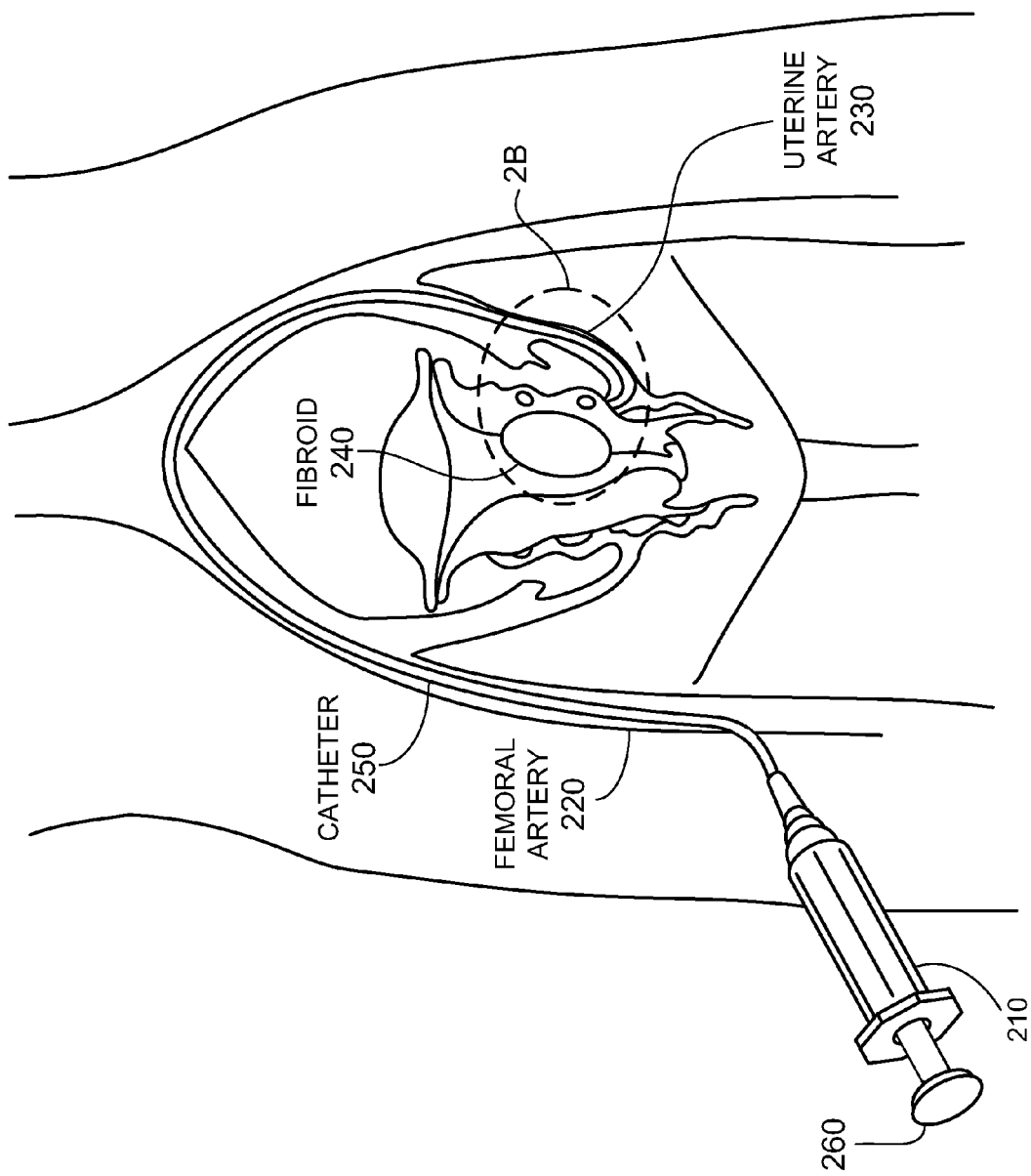
FIG. 5A is a schematic illustrating an embodiment of a method of injecting a composition including particles into a vessel.
Figure 5B:
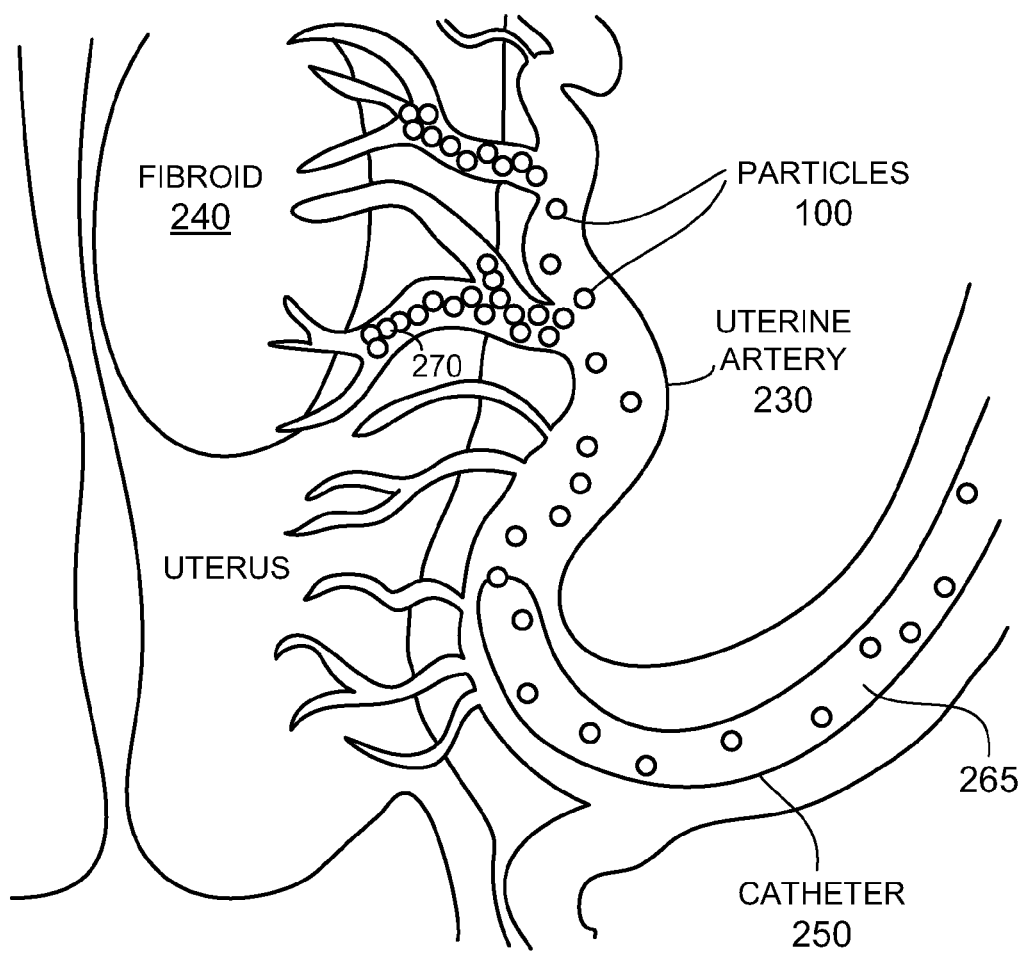
FIG. 5B is a greatly enlarged view of region 2B in FIG. 2A.

In some embodiments, in addition to or as an alternative to being used to deliver a therapeutic agent to a target site, particle 100 can be used to embolize a target site (e.g., a lumen of a subject). For example, multiple particles can be combined with a carrier fluid (e.g., a pharmaceutically acceptable carrier, such as a saline solution, a contrast agent, or both) to form a composition, which can then be delivered to a site and used to embolize the site. FIGS. 5A and 5B illustrate the use of a composition including particles to embolize a lumen of a subject. As shown, a composition including particles 100 and a carrier fluid is injected into a vessel through an instrument such as a catheter 250. Catheter 250 is connected to a syringe barrel 210 with a plunger 260. Catheter 250 is inserted, for example, into a femoral artery 220 of a subject. Catheter 250 delivers the composition to, for example, occlude a uterine artery 230 leading to a fibroid 240 located in the uterus of a female subject. The composition is initially loaded into syringe 210. Plunger 260 of syringe 210 is then compressed to deliver the composition through catheter 250 into a lumen 265 of uterine artery 230.

FIG. 5B, which is an enlarged view of section 5B of FIG. 5A, shows uterine artery 230, which is subdivided into smaller uterine vessels 270 (e.g., having a maximum dimension of two millimeters or less) that feed fibroid 240. The particles 100 in the composition partially or totally fill the lumen of uterine artery 230, either partially or completely occluding the lumen of the uterine artery 230 that feeds uterine fibroid 240.

Compositions including particles such as particles 100 can be delivered to various sites in the body, including, for example, sites having cancerous lesions, such as the breast, prostate, lung, thyroid, or ovaries. The compositions can be used in, for example, neural, pulmonary, and/or AAA (abdominal aortic aneurysm) applications. The compositions can be used in the treatment of, for example, fibroids, tumors, internal bleeding, arteriovenous malformations (AVMs), and/or hypervascular tumors. The compositions can be used as, for example, fillers for aneurysm sacs, AAA sac (Type II endoleaks), endoleak sealants, arterial sealants, and/or puncture sealants, and/or can be used to provide occlusion of other lumens such as fallopian tubes. Fibroids can include uterine fibroids which grow within the uterine wall (intramural type), on the outside of the uterus (subserosal type), inside the uterine cavity (submucosal type), between the layers of broad ligament supporting the uterus (interligamentous type), attached to another organ (parasitic type), or on a mushroom-like stalk (pedunculated type). Internal bleeding includes gastrointestinal, urinary, renal and varicose bleeding. AVMs are, for example, abnormal collections of blood vessels (e.g. in the brain) which shunt blood from a high pressure artery to a low pressure vein, resulting in hypoxia and malnutrition of those regions from which the blood is diverted. In some embodiments, a composition containing the particles can be used to prophylactically treat a condition.

The magnitude of a dose of a composition can vary based on the nature, location and severity of the condition to be treated, as well as the route of administration. A physician treating the condition, disease or disorder can determine an effective amount of composition. An effective amount of embolic composition refers to the amount sufficient to result in amelioration of symptoms and/or a prolongation of survival of the subject, or the amount sufficient to prophylactically treat a subject. The compositions can be administered as pharmaceutically acceptable compositions to a subject in any therapeutically acceptable dosage, including those administered to a subject intravenously, subcutaneously, percutaneously, intratrachealy, intramuscularly, intramucosaly, intracutaneously, intra-articularly, orally or parenterally.

A composition can include a mixture of particles (e.g., particles formed of polymers including different weight percents of vinyl formal monomer units, particles including different types of therapeutic agents), or can include particles that are all of the same type. In some embodiments, a composition can be prepared with a calibrated concentration of particles for ease of delivery by a physician. A physician can select a composition of a particular concentration based on, for example, the type of procedure to be performed. In certain embodiments, a physician can use a composition with a relatively high concentration of particles during one part of an embolization procedure, and a composition with a relatively low concentration of particles during another part of the embolization procedure.

Suspensions of particles in saline solution can be prepared to remain stable (e.g., to remain suspended in solution and not settle and/or float) over a desired period of time. A suspension of particles can be stable, for example, for from one minute to 20 minutes (e.g. from one minute to 10 minutes, from two minutes to seven minutes, from three minutes to six minutes).

In some embodiments, particles can be suspended in a physiological solution by matching the density of the solution to the density of the particles. In certain embodiments, the particles and/or the physiological solution can have a density of from one gram per cubic centimeter to 1.5 grams per cubic centimeter (e.g., from 1.2 grams per cubic centimeter to 1.4 grams per cubic centimeter, from 1.2 grams per cubic centimeter to 1.3 grams per cubic centimeter).

In some embodiments, the carrier fluid of a composition can include a surfactant. The surfactant can help the particles to mix evenly in the carrier fluid and/or can decrease the likelihood of the occlusion of a delivery device (e.g., a catheter) by the particles. In certain embodiments, the surfactant can enhance delivery of the composition (e.g., by enhancing the wetting properties of the particles and facilitating the passage of the particles through a delivery device). In some embodiments, the surfactant can decrease the occurrence of air entrapment by the particles in a composition (e.g., by porous particles in a composition). Examples of liquid surfactants include Tween® 80 (available from Sigma-Aldrich) and Cremophor EL® (available from Sigma-Aldrich). An example of a powder surfactant is Pluronic® F127 NF (available from BASF). In certain embodiments, a composition can include from 0.05 percent by weight to one percent by weight (e.g., 0.1 percent by weight, 0.5 percent by weight) of a surfactant. A surfactant can be added to the carrier fluid prior to mixing with the particles and/or can be added to the particles prior to mixing with the carrier fluid.

In some embodiments, among the particles delivered to a subject (e.g., in a composition), the majority (e.g., 50 percent or more, 60 percent or more, 70 percent or more, 80 percent or more, 90 percent or more) of the particles can have a maximum dimension of 3,000 microns or less (e.g., 2,500 microns or less; 2,000 microns or less; 1,500 microns or less; 1,200 microns or less; 1,150 microns or less; 1,100 microns or less; 1,050 microns or less; 1,000 microns or less; 900 microns or less; 700 microns or less; 500 microns or less; 400 microns or less; 300 microns or less; 100 microns or less; 50 microns or less; 10 microns or less; five microns or less) and/or one micron or more (e.g., five microns or more; 10 microns or more; 50 microns or more; 100 microns or more; 300 microns or more; 400 microns or more; 500 microns or more; 700 microns or more; 900 microns or more; 1,000 microns or more; 1,050 microns or more; 1,100 microns or more; 1,150 microns or more; 1,200 microns or more; 1,500 microns or more; 2,000 microns or more; 2,500 microns or more). In some embodiments, among the particles delivered to a subject, the majority of the particles can have a maximum dimension of less than 100 microns (e.g., less than 50 microns).

In certain embodiments, the particles delivered to a subject (e.g., in a composition) can have an arithmetic mean maximum dimension of 3,000 microns or less (e.g., 2,500 microns or less; 2,000 microns or less; 1,500 microns or less; 1,200 microns or less; 1,150 microns or less; 1,100 microns or less; 1,050 microns or less; 1,000 microns or less; 900 microns or less; 700 microns or less; 500 microns or less; 400 microns or less; 300 microns or less; 100 microns or less; 50 microns or less; 10 microns or less; five microns or less) and/or one micron or more (e.g., five microns or more; 10 microns or more; 50 microns or more; 100 microns or more; 300 microns or more; 400 microns or more; 500 microns or more; 700 microns or more; 900 microns or more; 1,000 microns or more; 1,050 microns or more; 1,100 microns or more; 1,150 microns or more; 1,200 microns or more; 1,500 microns or more; 2,000 microns or more; 2,500 microns or more). In some embodiments, the particles delivered to a subject can have an arithmetic mean maximum dimension of less than 100 microns (e.g., less than 50 microns).

Exemplary ranges for the arithmetic mean maximum dimension of particles delivered to a subject include from 100 microns to 500 microns; from 100 microns to 300 microns; from 300 microns to 500 microns; from 500 microns to 700 microns; from 700 microns to 900 microns; from 900 microns to 1,200 microns; and from 1,000 microns to 1,200 microns. In general, the particles delivered to a subject (e.g., in a composition) can have an arithmetic mean maximum dimension in approximately the middle of the range of the maximum dimensions of the individual particles, and a variance of 20 percent or less (e.g. 15 percent or less, 10 percent or less).

In some embodiments, the arithmetic mean maximum dimension of the particles delivered to a subject (e.g., in a composition) can vary depending upon the particular condition to be treated. As an example, in certain embodiments in which the particles are used to embolize a liver tumor, the particles delivered to the subject can have an arithmetic mean maximum dimension of 500 microns or less (e.g., from 100 microns to 300 microns; from 300 microns to 500 microns). As another example, in some embodiments in which the particles are used to embolize a uterine fibroid, the particles delivered to the subject can have an arithmetic mean maximum dimension of 1,200 microns or less (e.g., from 500 microns to 700 microns; from 700 microns to 900 microns; from 900 microns to 1,200 microns). As an additional example, in certain embodiments in which the particles are used to treat a neural condition (e.g., a brain tumor) and/or head trauma (e.g., bleeding in the head), the particles delivered to the subject can have an arithmetic mean maximum dimension of less than 100 microns (e.g., less than 50 microns). As a further example, in some embodiments in which the particles are used to treat a lung condition, the particles delivered to the subject can have an arithmetic mean maximum dimension of less than 100 microns (e.g., less than 50 microns). As another example, in certain embodiments in which the particles are used to treat thyroid cancer, the particles can have a maximum dimension of 1,200 microns or less (e.g., from 1,000 microns to 1,200 microns). As an additional example, in some embodiments in which the particles are used only for therapeutic agent delivery, the particles can have an arithmetic mean maximum dimension of less than 100 microns (e.g., less than 50 microns, less than 10 microns, less than five microns).

The arithmetic mean maximum dimension of a group of particles can be determined using a Beckman Coulter Rapid-VUE Image Analyzer version 2.06 (Beckman Coulter, Miami, Fla.), described above. The arithmetic mean maximum dimension of a group of particles (e.g., in a composition) can be determined by dividing the sum of the maximum dimensions of all of the particles in the group by the number of particles in the group.

Figure 6:
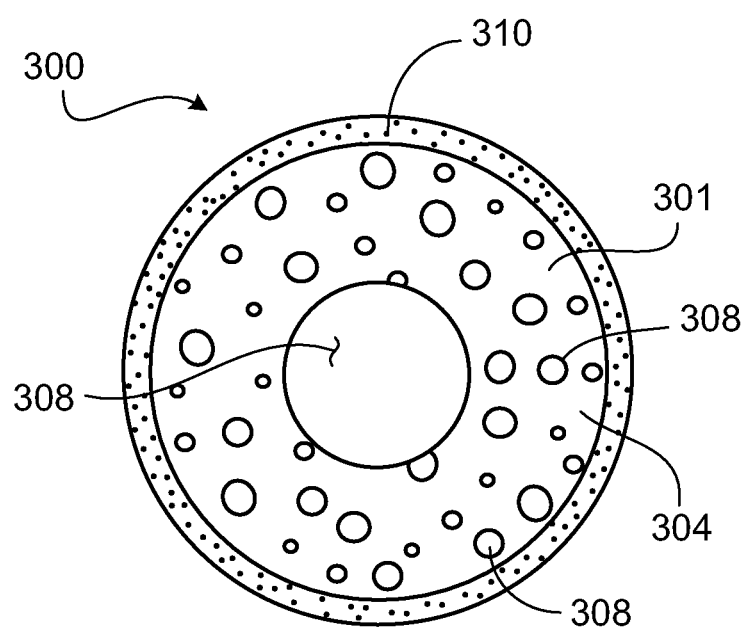
FIG. 6 is a cross-sectional view of an embodiment of a particle.

In certain embodiments, a particle that includes a polymer including vinyl formal monomer units can also include a coating. For example, FIG. 6 shows a particle 300 having an interior region 301 including a cavity 302 surrounded by a matrix 304. Matrix 304 includes pores 308, and is formed of a polymer including vinyl formal monomer units. Particle 300 additionally includes a coating 310 formed of a polymer (e.g., alginate) that is different from the polymer in matrix 304. Coating 310 can, for example, regulate the release of therapeutic agent from particle 300, and/or provide protection to interior region 301 of particle 300 (e.g., during delivery of particle 300 to a target site). In certain embodiments, coating 310 can be formed of a bioerodible and/or bioabsorbable material that can erode and/or be absorbed as particle 300 is delivered to a target site. This can, for example, allow interior region 301 to deliver a therapeutic agent to the target site once particle 300 has reached the target site. A bioerodible material can be, for example, a polysaccharide (e.g., alginate); a polysaccharide derivative; an inorganic, ionic salt; a water soluble polymer (e.g., polyvinyl alcohol, such as polyvinyl alcohol that has not been cross-linked); biodegradable poly DL-lactide-poly ethylene glycol (PELA); a hydrogel (e.g., polyacrylic acid, hyaluronic acid, gelatin, carboxymethyl cellulose); a polyethylene glycol (PEG); chitosan; a polyester (e.g., a polycaprolactone); a poly(ortho ester); a polyanhydride; a poly (lactic-co-glycolic) acid (e.g., a poly(d-lactic-co-glycolic) acid); a poly(lactic acid) (PLA); a poly(glycolic acid) (PGA); or a combination thereof. In some embodiments, coating 310 can be formed of a swellable material, such as a hydrogel (e.g., polyacrylamide co-acrylic acid). The swellable material can be made to swell by, for example, changes in pH, temperature, and/or salt. In certain embodiments in which particle 300 is used in an embolization procedure, coating 310 can swell at a target site, thereby enhancing occlusion of the target site by particle 300.

Figure 7:
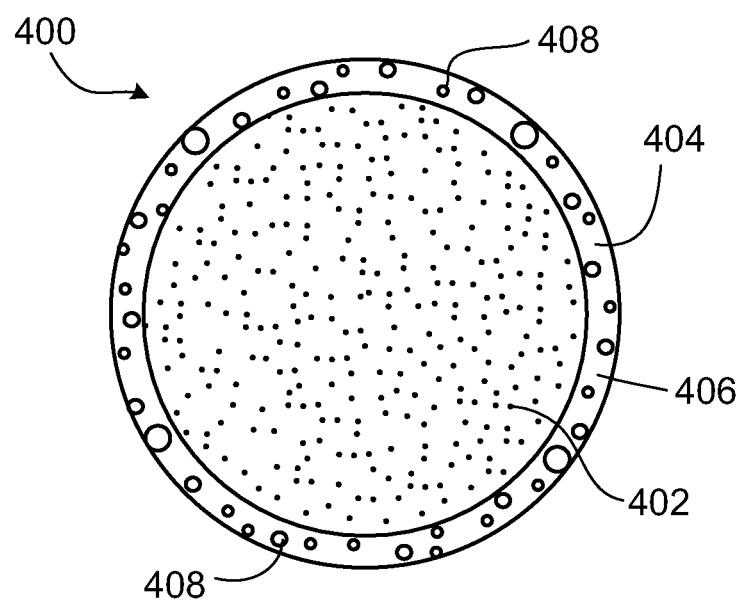
FIG. 7 is a cross-sectional view of an embodiment of a particle.

In some embodiments, a particle can include a porous coating that is formed of a polymer including vinyl formal monomer units. For example, FIG. 7 shows a particle 400 including an interior region 402 and a coating 404. Coating 404 is formed of a matrix 406 that is formed of a polymer including vinyl formal monomer units. Coating 404 also includes pores 408. In certain embodiments, interior region 402 can be formed of a swellable material. Pores 408 in coating 404 can expose interior region 402 to changes in, for example, pH, temperature, and/or salt. When interior region 402 is exposed to these changes, the swellable material in interior region 402 can swell, thereby causing particle 400 to become enlarged. In certain embodiments, coating 404 can be relatively flexible, and can accommodate the swelling of interior region 402. The enlargement of particle 400 can, for example, enhance occlusion during an embolization procedure.

Examples of swellable materials include hydrogels, such as polyacrylic acid, polyacrylamide co-acrylic acid, hyaluronic acid, gelatin, carboxymethyl cellulose, poly(ethylene oxide)-based polyurethane, polyaspartahydrazide, ethyleneglycoldiglycidylether (EGDGE), and polyvinyl alcohol (PVA) hydrogels. In some embodiments in which a particle includes a hydrogel, the hydrogel can be cross-linked, such that it may not dissolve when it swells. In other embodiments, the hydrogel may not be crosslinked, such that the hydrogel may dissolve when it swells.

In certain embodiments, a particle can include a coating that includes one or more therapeutic agents (e.g., a relatively high concentration of one or more therapeutic agents). One or more of the therapeutic agents can also be loaded into the interior region of the particle. Thus, the surface of the particle can release an initial dosage of therapeutic agent, after which the interior region of the particle can provide a burst release of therapeutic agent. The therapeutic agent on the surface of the particle can be the same as or different from the therapeutic agent in the interior region of the particle. The therapeutic agent on the surface of the particle can be applied to the particle by, for example, exposing the particle to a high concentration solution of the therapeutic agent.

In some embodiments, a therapeutic agent coated particle can include another coating over the surface of the therapeutic agent (e.g., a bioerodible polymer which erodes when the particle is administered). The coating can assist in controlling the rate at which therapeutic agent is released from the particle. For example, the coating can be in the form of a porous membrane. The coating can delay an initial burst of therapeutic agent release. In certain embodiments, the coating can be applied by dipping and/or spraying the particle. The bioerodible polymer can be a polysaccharide (e.g., alginate). In some embodiments, the coating can be an inorganic, ionic salt. Other examples of bioerodible coating materials include polysaccharide derivatives, water-soluble polymers (such as polyvinyl alcohol, e.g., that has not been cross-linked), biodegradable poly DL-lactide-poly ethylene glycol (PELA), hydrogels (e.g., polyacrylic acid, hyaluronic acid, gelatin, carboxymethyl cellulose), polyethylene glycols (PEG), chitosan, polyesters (e.g., polycaprolactones), poly(ortho esters), polyanhydrides, poly(lactic acids) (PLA), polyglycolic acids (PGA), poly(lactic-co-glycolic) acids (e.g., poly(d-lactic-co-glycolic) acids), and combinations thereof. The coating can include therapeutic agent or can be substantially free of therapeutic agent. The therapeutic agent in the coating can be the same as or different from an agent on a surface layer of the particle and/or within the particle. A polymer coating (e.g., a bioerodible coating) can be applied to the particle surface in embodiments in which a high concentration of therapeutic agent has not been applied to the particle surface. Coatings are described, for example, in DiMatteo et al., U.S. Patent Application Publication No. US 2004/0076582 A1, published on Apr. 22, 2004, and entitled "Agent Delivery Particle", which is incorporated herein by reference.

Particles can be formed by any of a number of different methods.

Figure 8A:
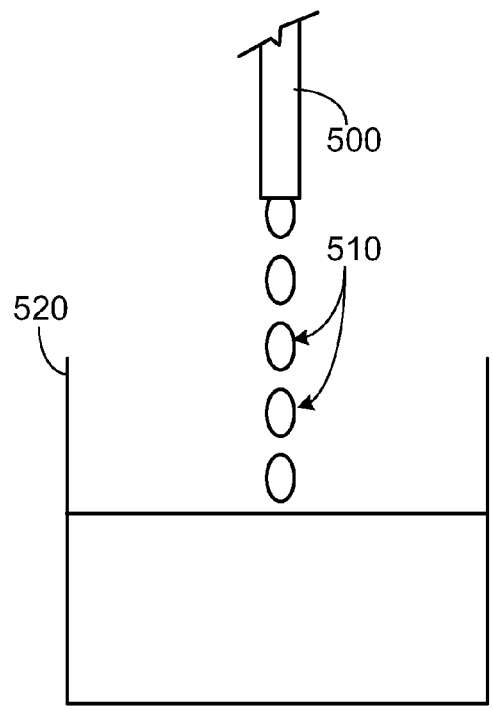
FIGS. 8A-8C are an illustration of an embodiment of a system and method for producing particles.
Figure 8B:
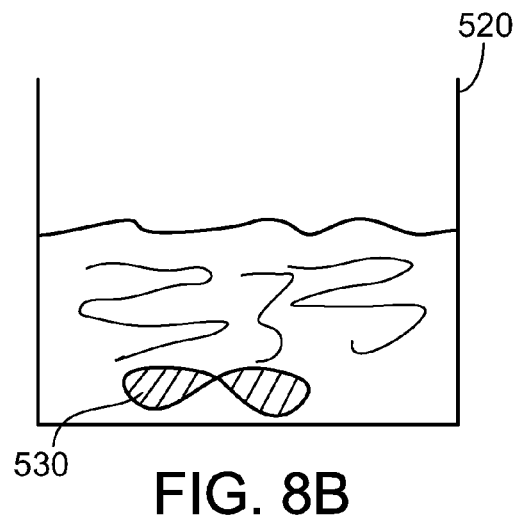
Figure 8C:
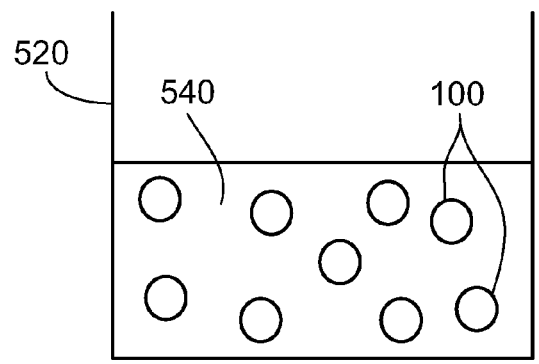

As an example, FIGS. 8A-8C show a single-emulsion process that can be used, for example, to make particles such as particle 100 (FIGS. 1A and 1B).

As shown in FIGS. 8A-8C, a drop generator 500 (e.g., a pipette, a needle) forms drops 510 of an organic solution including an organic solvent, a therapeutic agent, and a polymer including vinyl formal monomer units. Examples of organic solvents include glacial acetic acid, N,N-dimethylformamide (DMF), tetrahydrofuran (THF), and dimethylsulfoxide (DMSO). In certain embodiments, the organic solvent can be an aprotic polar solvent (e.g., DMF), which can dissolve both polar therapeutic agents and some nonpolar therapeutic agents. In some embodiments, the organic solution can include at least 70 percent by volume (e.g., at least 80 percent by volume, at least 90 percent by volume) and/or at most 97 percent by volume (e.g., at most 90 percent by volume, at most 80 percent by volume) of the organic solvent. In certain embodiments, the organic solution can include at least three percent weight/volume (w/v) (e.g., at least 10 percent w/v, at least 20 percent w/v), and/or at most 30 percent w/v (e.g., at most 20 percent w/v, at most 10 percent w/v), of the polymer including vinyl formal monomer units. As an example, in some embodiments, the organic solution can include 10 percent w/v of the polymer including vinyl formal monomer units. In general, as the concentration of the polymer in the organic solution increases, the sizes and/or masses of the particles that are formed from the organic solution can also increase. Typically, as the volume of organic solvent in the organic solution that is used to form drops 510 decreases, the rate at which particles form can increase. Generally, the rate of particle formation can increase as the volume of organic solvent that is used decreases. Without wishing to be bound by theory, it is believed that this occurs because the organic solvent can evaporate from drops 510 more quickly during the particle formation process.

After they are formed, drops 510 fall from drop generator 500 into a vessel 520 that contains an aqueous solution including water (e.g., from 50 milliliters to 100 milliliters of water) and a surfactant. Examples of surfactants include lauryl sulfate, polyvinyl alcohols, poly(vinyl pyrrolidone) (PVP), and polysorbates (e.g., Tween® 20, Tween® 80). The concentration of the surfactant in the aqueous solution can be at least 0.1 percent w/v (e.g., at least 0.5 percent w/v, at least one percent w/v, at least three percent w/v), and/or at most five percent w/v (e.g., at most three percent w/v, at most one percent w/v, at most 0.5 percent w/v). For example, in some embodiments, the solution can include one percent w/v lauryl sulfate. Generally, as the concentration of the surfactant in the aqueous solution increases, the sphericity of the particles that are produced from the drop generation process, and the rate of formation of the particles during the particle formation process, can also increase. In some embodiments, the aqueous solution can be at a temperature of at least 4° C. (e.g., at least 10° C., at least 20° C., at least 30° C.) and/or at most 40° C. (e.g., at most 30° C., at most 20° C., at most 10° C.). Typically, as the temperature of the aqueous solution increases, the rate at which particles (e.g., relatively rigid particles) form can also increase.

As FIG. 8B shows, after drops 510 have fallen into vessel 520, the solution is mixed (e.g., homogenized) using a stirrer 530. In some embodiments, the solution can be mixed for a period of at least six hours (e.g., at least 15 hours, at least 30 hours) and/or at most 48 hours (e.g., at most 30 hours, at most 15 hours). In certain embodiments, mixing can occur at a temperature of at least 4° C. (e.g., at least 10° C., at least 20° C., at least 30° C.) and/or at most 40° C. (e.g., at most 30° C., at most 20° C., at most 10° C.). The mixing results in a suspension 540 including particles 100 suspended in the solvent (FIG. 8C). Without wishing to be bound by theory, it is believed that the water insolubility of the polymer including vinyl formal monomer units can cause the polymer to form particles when the polymer is added into an aqueous solution and mixed.

After particles 100 have been formed, they are separated from the solvent by, for example, filtration (e.g., through a drop funnel, filter paper, and/or a wire mesh), centrifuging followed by removal of the supernatant, and/or decanting. Thereafter, particles 100 are dried (e.g., by evaporation, by vacuum drying, by air drying). In some embodiments, combinations of drying methods can be used. As an example, in certain embodiments, particles 100 can be air-dried. In certain embodiments, after being formed, particles 100 can be stored in a carrier fluid, such as saline. In some embodiments, particles 100 can be stored in deionized water.

In certain embodiments, the porosity of particles (e.g., particles 100) that are formed using an emulsion process (e.g., a single-emulsion process, such as the process describe above with reference to FIGS. 8A-8C) can be increased or decreased by adjusting one or more of the parameters of the emulsion process. As an example, as the viscosity of the organic solution increases, the porosity of the resulting particles can decrease. In some embodiments (e.g., some embodiments in which the organic solution includes five percent w/v of the polymer including vinyl formal monomer units), the organic solution can have a viscosity of at least eight mPa·s (e.g., at least 20 mPa·s, at least 35 mPa·s) and/or at most 51.2 mPa·s (e.g., at most 35 mPa·s, at most 20 mPa·s). As used herein, the viscosity of an organic solution is measured at 20° C., using an Ostwald Viscometer. As another example, as the volume of organic solvent used in the organic solution decreases, the porosity of the resulting particles can decrease. Without wishing to be bound by theory, it is believed that when the organic solvent leaves the polymer phase during the particle formation process, it can cause pores to form in the resulting particles. Thus, when a smaller volume of organic solvent is used in the particle formation process, the particles that are formed may have a lower porosity. As an additional example, in some embodiments, as the volume of water in the aqueous solution increases, the porosity of the resulting particles can also increase. As a further example, as the weight per unit volume of surfactant in the aqueous solution increases, the porosity of the resulting particles can also increase.

In some embodiments, the size of drop generator 500 (e.g., the needle gauge, the pipette maximum dimension) can be selected to result in the formation of particles 100 of a desired size. Typically, as the size of drop generator 500 decreases, the size of particles 100 can also decrease.

Figure 9:
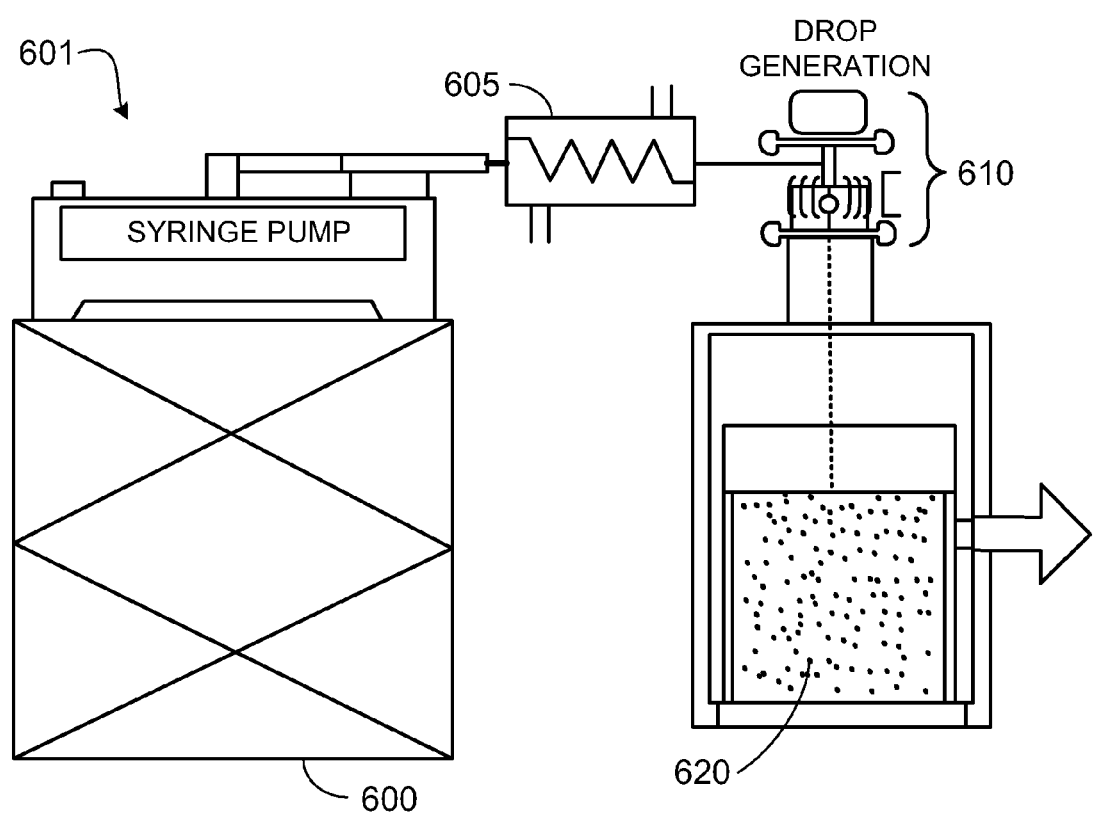
FIG. 9 is an illustration of an embodiment of a drop generator.

While pipettes and needles have been described as examples of drop generators that can be used in a particle formation process, in some embodiments, other types of drop generators or drop generator systems can be used in a particle formation process. For example, FIG. 9 shows a drop generator system 601 that includes a flow controller 600, a viscosity controller 605, a drop generator 610, and a vessel 620. Flow controller 600 delivers a solution (e.g., a solution including a solvent, a therapeutic agent, and a polymer including vinyl formal monomer units) to viscosity controller 605, which heats the solution to reduce its viscosity prior to delivery to drop generator 610. The solution then passes through an orifice in a nozzle in drop generator 610, resulting in the formation of drops of the solution. The drops are then directed into vessel 620, which contains, for example, an aqueous solution including a surfactant such as polyvinyl alcohol (PVA). Drop generators are described, for example, in Lanphere et al., U.S. Patent Application Publication No. US 2004/0096662 A1, published on May 20, 2004, and entitled "Embolization", and in DiCarlo et al., U.S. patent application Ser. No. 11/111,511, filed on Apr. 21, 2005, and entitled "Particles", both of which are incorporated herein by reference.

Figure 10A:
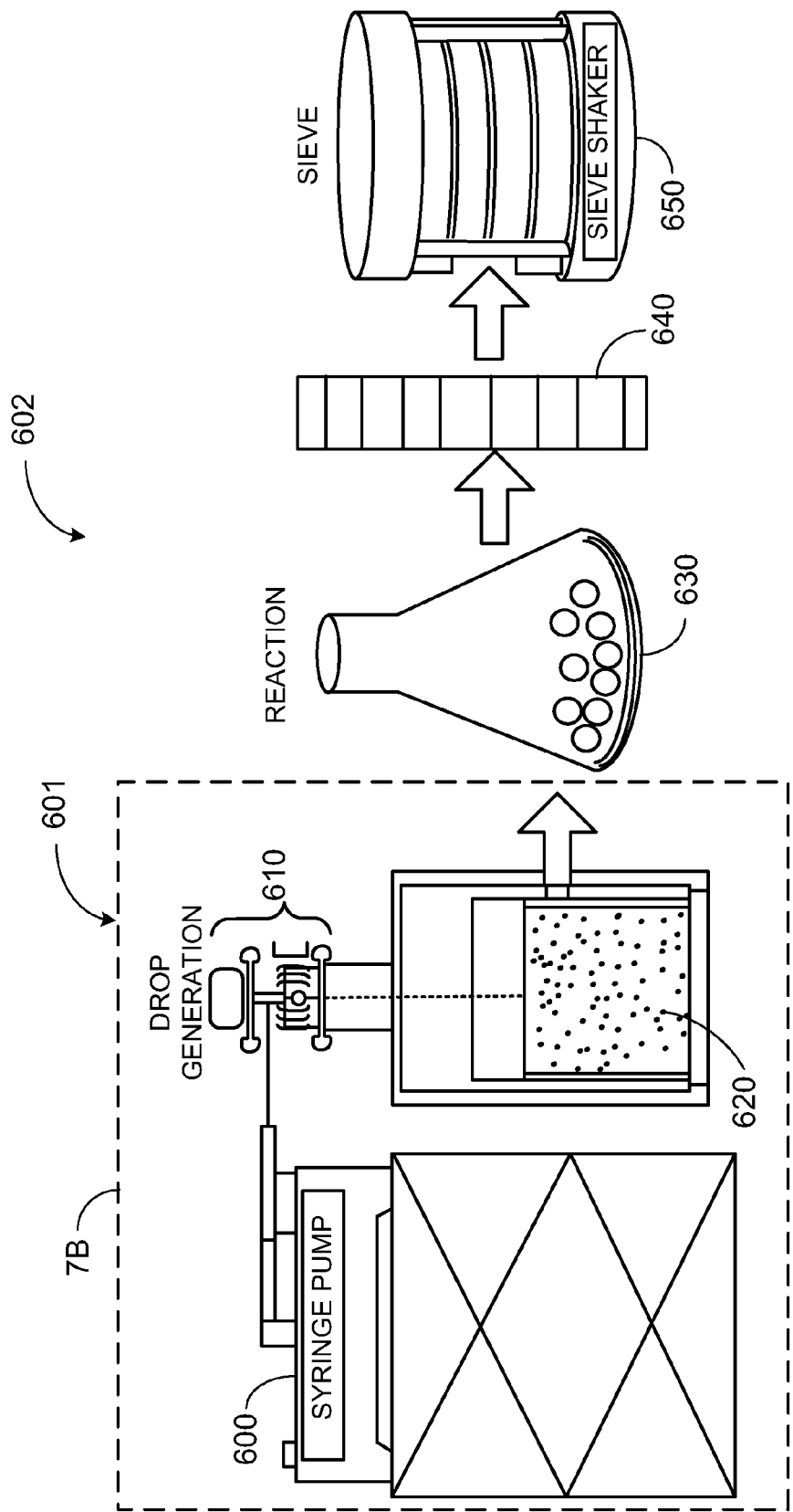
FIGS. 10A and 10B are an illustration of an embodiment of a system and method for producing particles.
Figure 10B:
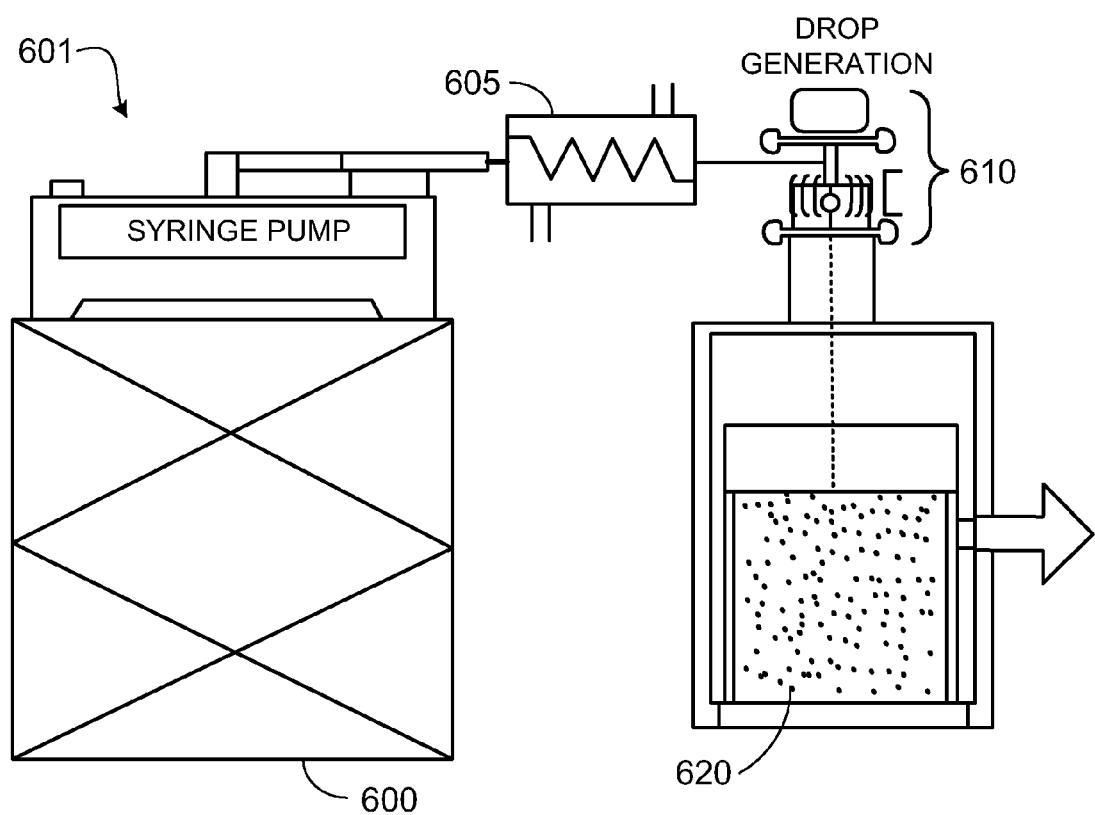

FIGS. 10A and 10B show an embodiment of a system 602 that includes drop generator system 601, and that can be used, for example, to make porous particles including polymers having vinyl formal monomer units. System 602 includes drop generator system 601, a reactor vessel 630, a gel dissolution chamber 640 and a filter 650. During use of system 602, flow controller 600 delivers a solution that contains one or more polymers (e.g., a polymer including vinyl formal monomer units) and a gelling precursor (e.g., alginate) to viscosity controller 605, which heats the solution to reduce viscosity prior to delivery to drop generator 610. The solution passes through an orifice in a nozzle in drop generator 610, forming drops of the solution. The drops are then directed into vessel 620 (in this process, used as a gelling vessel), where the drops contact a gelling agent (e.g., calcium chloride) that converts the gelling precursor from a solution form into a gel form, stabilizing the drops and forming particles. In some embodiments, the particles can be transferred from vessel 620 to reactor vessel 630, where one or more polymers in the gel-stabilized particles can be reacted (e.g., cross-linked). In certain embodiments in which the gel-stabilized particles include a polymer including vinyl formal monomer units, the polymer can be further formalized in reactor vessel 630 (so that the weight percent of vinyl formal monomer units in the polymer increases). In some embodiments (e.g., some embodiments in which the polymer in the solution already has a desired amount of cross-linking), the particles may not be transferred to reactor vessel 630. In certain embodiments, the particles can be transferred to gel dissolution chamber 640, where the gelling precursor (which was converted to a gel) can be removed from the particles. In some embodiments, the removal of the gel from the particles can result in the formation of pores in the particles. After they have been formed, the particles can be filtered in filter 650 to remove debris. In certain embodiments, the particles can thereafter be coated with, for example, a polymer (e.g., a polyvinyl alcohol). In some embodiments, the coating can be added to the particles by spraying and/or dip-coating. These coating processes can be used, for example, to form particles such as particle 300 (FIG. 6). Finally, the particles can be sterilized and packaged as, for example, an embolic composition including the particles.

While alginate has been described as a gelling precursor, other types of gelling precursors can be used. Gelling precursors include, for example, alginate salts, xanthan gums, natural gum, agar, agarose, chitosan, carrageenan, fucoidan, furcellaran, laminaran, hypnea, eucheuma, gum arabic, gum ghatti, gum karaya, gum tragacanth, hyaluronic acid, locust beam gum, arabinogalactan, pectin, amylopectin, other water soluble polysaccharides and other ionically cross-linkable polymers. A particular gelling precursor is sodium alginate, such as high guluronic acid, stem-derived alginate (e.g., 50 percent or more, 60 percent or more guluronic acid) with a low viscosity (e.g., from 20 centipoise to 80 centipoise at 20° C.), which can produce a high tensile, robust gel.

As described above, in some embodiments (e.g., some embodiments in which alginate is used as a gelling precursor), vessel 620 can include a gelling agent such as calcium chloride. The calcium cations in the calcium chloride have an affinity for carboxylic groups in the gelling precursor. In some embodiments, the cations can complex with carboxylic groups in the gelling precursor. Without wishing to be bound by theory, it is believed that the complexing of the cations with carboxylic groups in the gelling precursor can cause different regions of the gelling precursor to be pulled closer together, causing the gelling precursor to gel. In certain embodiments, the complexing of the cations with carboxylic groups in the gelling precursor can result in encapsulation of one or more other polymers (e.g., a polymer including vinyl formal monomer units) in a matrix of gelling precursor.

While calcium chloride has been described as a gelling agent, other types of gelling agents can be used. Examples of gelling agents include divalent cations such as alkali metal salts, alkaline earth metal salts, or transition metal salts that can ionically cross-link with the gelling precursor. In some embodiments, an inorganic salt, such as a calcium, barium, zinc or magnesium salt, can be used as a gelling agent.

As discussed above, in certain embodiments, the particles can be transferred to reactor vessel 630 during the particle formation process, where one or more polymers in the particles can, for example, be cross-linked by one or more cross-linking agents. Examples of cross-linking agents that may be used to react one or more of the polymers (e.g., a polymer including vinyl alcohol monomer units) in reactor vessel 630 include one or more aldehydes (e.g., formaldehyde, glyoxal, benzaldehyde, aterephthalaldehyde, succinaldehyde, glutaraldehyde) in combination with one or more acids, such as relatively strong acids (e.g., sulfuric acid, hydrochloric acid, nitric acid) and/or relatively weak acids (e.g., acetic acid, formic acid, phosphoric acid).

In some embodiments, it can be desirable to reduce the surface tension of the mixture contained in vessel 620 (e.g., when forming particles having a maximum dimension of 500 microns or less). This can be achieved, for example, by heating the mixture in vessel 620 (e.g., to a temperature greater than room temperature, such as a temperature of 30° C. or more), by bubbling a gas (e.g., air, nitrogen, argon, krypton, helium, neon) through the mixture contained in vessel 620, by stirring (e.g., via a magnetic stirrer) the mixture contained in vessel 620, by including a surfactant in the mixture containing the gelling agent, and/or by forming a mist containing the gelling agent above the mixture contained in vessel 620 (e.g., to reduce the formation of tails and/or enhance the sphericity of the particles).

In certain embodiments, particles can be formed by omitting one or more of the steps from the process described with reference to FIGS. 10A and 10B. For example, one or more of the polymers may not be crosslinked, and/or the gelling precursor may not be removed.

In some embodiments, particles including a polymer including vinyl formal monomer units can be formed by a solvent evaporation method. First, a polymer solution can be formed by dissolving a polymer including vinyl formal monomer units in a solvent (e.g., dichloromethane, chloroform, benzene, toluene). Then, the polymer solution can be poured as a stream into an aqueous solution including a surfactant (e.g., polyvinyl alcohol) under stirring. The interfacial tension between the polymer solution and the aqueous solution can result in the formation of particles having relatively good sphericity. The solvent can be evaporated over time, thereby causing the particles to harden. The resulting particles can be relatively hard while also being relatively compressible, and/or can have relatively little porosity.

Methods of forming particles (e.g., particles including one or more polymers) are described in, for example, Song et al., U.S. patent application Ser. No. 11/314,056, filed on Dec. 21, 2005 and entitled "Block Copolymer Particles"; Song et al., U.S. patent application Ser. No. 11/314,557, filed on Dec. 21, 2005 and entitled "Block Copolymer Particles"; Buiser et al., U.S. Patent Application Publication No. US 2003/0185896 A1, published on Oct. 2, 2003, and entitled "Embolization"; Lanphere et al., U.S. Patent Application Publication No. US 2004/0096662 A1, published on May 20, 2004, and entitled "Embolization"; Lanphere et al., U.S. Patent Application Publication No. US 2005/0263916 A1, published on Dec. 1, 2005, and entitled "Embolization"; and DiCarlo et al., U.S. patent application Ser. No. 11/111,511, filed on Apr. 21, 2005, and entitled "Particles", all of which are incorporated herein by reference.

In some embodiments, one or more of the therapeutic agents can be omitted from the processes described above with respect to FIGS. 8A-8C, 9, and/or 10A-10B. In certain embodiments, all of the therapeutic agents can be omitted from a particle formation process, such that the particles that are produced do not include any therapeutic agent. Alternatively or additionally, one or more therapeutic agents can be added to the particles (e.g., by adsorption, by absorption) after the particles have been formed. The therapeutic agents can be incorporated into the particles by, for example, immersing the particles in the therapeutic agents (e.g., in a solution including the therapeutic agents), and/or spraying the particles with the therapeutic agents (e.g., with a solution including the therapeutic agents). Immersing the particles in the therapeutic agents can allow the particles to imbibe the therapeutic agents. In some embodiments in which the particles are porous, the porosity of the particles can, for example, help the therapeutic agents to diffuse into the particles and/or help the particles to retain a relatively high volume of the therapeutic agents. In certain embodiments, the therapeutic agents can be incorporated into the particles by coating the particles with the therapeutic agents. In some embodiments, the therapeutic agents can be incorporated into the particles by covalently bonding the therapeutic agents to one or more of the materials (e.g., polymers) out of which the particles are formed. For example, in some embodiments in which a particle includes a polymer including vinyl formal monomer units and having pendant hydroxyl groups, the pendant hydroxyl groups can be used to form ester linkages with one or more therapeutic agents (e.g., acidic therapeutic agents). In certain embodiments, the therapeutic agents can be incorporated into the particles by spray-drying and/or coating the particles with the therapeutic agents in a fluidized bed dryer. In some embodiments, particles that are coated with a therapeutic agent in a fluidized bed dryer can have a relatively even coating of the therapeutic agent and/or can be relatively unlikely to stick to each other during the coating process.

Other Embodiments

While certain embodiments have been described, other embodiments are possible.

As an example, in some embodiments, one or more therapeutic agents can be micronized, and the micronized therapeutic agents can be incorporated into particles (e.g., particles including a polymer including vinyl formal monomer units). As used herein, a therapeutic agent is micronized by pulverizing the therapeutic agent in dry form (e.g., using a mill, such as a ball mill, an air jet mill, and/or a colloidal mill) and adding a binder (e.g., sticky acacia, sugar syrup, and/or one or more gums such as tragacanth) to the therapeutic agent to form particles of the therapeutic agent that are at least 0.5 micron (e.g., at least 10 microns, at least 50 microns, at least 100 microns, at least 250 microns, at least 500 microns, at least 1,000 microns, at least 2,000 microns), and/or at most 3,000 microns (e.g., at most 2,000 microns, at most 1,000 microns, at most 500 microns, at most 250 microns, at most 100 microns, at most 50 microns, at most 10 microns), in maximum dimension. In certain embodiments, the micronized therapeutic agent particles can have a size that is selected to be at least an order of magnitude smaller than the desired maximum dimension of the particles that are being formed. This can, for example, limit the likelihood of the particles releasing large bursts of therapeutic agent during use. Generally, when therapeutic agent-containing particles are formed by using a micronized therapeutic agent in the process described above with respect to FIGS. 8A-8C, as the viscosity of the organic solution used in the particle formation process increases, the homogeneity of distribution of the therapeutic agent in the resulting particles can increase. Without wishing to be bound by theory, it is believed that this increase in homogeneity results from the highly viscous organic solution hindering migration of the micronized therapeutic agent particles to the surface of the drops.

In some embodiments, one or more micronized therapeutic agents can be suspended in a polymer solution that is then used in a drop generation process to form particles.

In certain embodiments, a particle can be formed of one or more bioerodible materials, such as the bioerodible materials described above. The particle can further include a micronized therapeutic agent (e.g., dispersed throughout a matrix of the bioerodible material). As the particle erodes, it can release the micronized therapeutic agent which can, in turn, erode over a period of time. The result can be that the particle has two rate-limiting steps to therapeutic agent release: the first being the release of the micronized therapeutic agent from the particle, and the second being the erosion of the micronized therapeutic agent once it has been released from the particle.

As another example, in some embodiments, the following process can be used to incorporate a relatively high volume of a hydrophilic therapeutic agent into a particle including a polymer including vinyl formal monomer units. For example, in certain embodiments, the following process can be used to incorporate a hydrophilic therapeutic agent into a particle in a volume that is greater than 50 percent of the volume of the particle. First, the therapeutic agent is micronized to form relatively small particles of therapeutic agent. Next, the micronized therapeutic agent is either dissolved in a solution including a solvent (e.g., DMF) and a polymer including vinyl formal monomer units, or is dissolved in a polar co-solvent (e.g., benzyl alcohol, cresol, xylenol, acetic acid) to form a solution that is then added into a polymer solution including a solvent (e.g., DMF) and a polymer including vinyl formal monomer units (e.g., in which the concentration of the polymer in the polymer solution is from five percent w/v to 10 percent w/v). In either case, the resulting mixture is added into a drop generator, which is used to form drops of the mixture. After being formed, the drops fall into a surfactant-containing solution at room temperature (25° C.). Rapid precipitation of the polymer in the aqueous surfactant-containing solution can be limited or prevented by, for example, quickly removing the particles after they have formed and/or adjusting the pH of the surfactant solution based on the pKa of the therapeutic agent, so that the therapeutic agent is insoluble at the selected pH. In some embodiments, the amount of therapeutic agent that is incorporated into the particles can be increased by adding one or more osmotic agents into the aqueous surfactant-containing solution. Examples of osmotic agents include sodium chloride and calcium chloride.

In certain embodiments, a double-emulsion process can be used to form particles including a hydrophilic therapeutic agent and/or a hydrophobic therapeutic agent. First, the therapeutic agent is dissolved and/or dispersed in water or an aqueous solution to form a therapeutic agent mixture. Next, the therapeutic agent mixture is homogenized with an organic solution including an organic solvent and a polymer including vinyl formal monomer units. During homogenization, particles can form, and the hydrophilic therapeutic agent and/or hydrophobic therapeutic agent can become trapped within the particles. The particles can then be added into an aqueous phase including a stabilizer and/or a surfactant (e.g., from 0.1 percent w/v to 0.5 percent w/v polyvinyl alcohol) and allowed to harden. Thereafter, the solvent can be removed from the particles. The resulting particles can include both the polymer and the hydrophilic therapeutic agent and/or hydrophobic therapeutic agent.

As a further example, in some embodiments, the following process can be used to incorporate a relatively high volume of hydrophobic therapeutic agent into a particle including a polymer including vinyl formal monomer units. First, the therapeutic agent is micronized finely and dispersed in a solution including the polymer and DMF to form a mixture. After the mixture has been formed, it is added into a drop generator, which forms drops of the mixture. The drops fall into an aqueous surfactant-containing solution, forming a second mixture. The second mixture is stirred, resulting in the formation of particles. The particles can be separated from the second mixture by, for example, filtration.

As an additional example, in some embodiments, a particle including a therapeutic agent (e.g., a hydrophilic therapeutic agent, a hydrophobic therapeutic agent) can be formed according to the following phase separation coacervation method. First, a polymer (e.g., a polymer including vinyl formal monomer units) is dissolved in a halogenated solvent (e.g., chloroform, dichloromethane) in which therapeutic agent particles are dissolved and/or suspended, to form a mixture. Next, a phase inducer that causes drop formation is added to the mixture in a controlled manner to form a pseudo-emulsion. Examples of phase inducers include solvents in which the polymer is insoluble, salts (e.g., sodium chloride), and nucleating agents (e.g., charge-carrying agents having a charge that is opposite to the charge of the polymer). Examples of solvents in which a polymer including vinyl formal monomer units is insoluble (or is not completely soluble) include single solvents (e.g., water, methyl alcohol, ethyl alcohol, methyl acetate, ethyl acetate, butyl acetate, acetone, methyl ethyl ketone, cyclohexanone, nitropropane, hydrocarbons) and mixed solvents (e.g., toluene-butyl alcohol (60:40), benzene-butyl alcohol (60:40), xylene-butyl alcohol (60:40)). After the pseudo-emulsion has been formed, phase separation occurs as the drops coalesce to form bigger drops, which eventually precipitate as particles. The particles can then be separated from the pseudo-emulsion (e.g., by filtration). In some embodiments, the particles can be hardened by being added to a solvent such as hexane, heptane, isopropyl myristate, an ester solvent, and/or a halocarbon solvent. In certain embodiments, the insolubility of the polymer including vinyl formal monomer units in the solvent can cause the particles to harden when the particles are added into the solvent.

As another example, in certain embodiments, a concentric nozzle can be used in a drop generation process. An example of a drop generator including a concentric nozzle is the Inotech Encapsulator unit IE-50R/NS (Inotech AG, Dottikon, Switzerland) with the model IE-5250 attachment (available from Inotech AG). In some embodiments, a concentric nozzle can be used to form particles including a polymer and a therapeutic agent that is insoluble in the polymer. For example, a concentric nozzle can be used to form a particle including a cavity surrounded by a matrix formed of a polymer including vinyl formal monomer units. The cavity can contain a therapeutic agent that is insoluble in the polymer. The therapeutic agent can be in solid form or in liquid form.

As a further example, in some embodiments, a freeze-drying process can be used to add one or more therapeutic agents to a particle (e.g., to the surface region and/or interior region of the particle). For example, particles can be added into a therapeutic agent solution. The resulting suspension of particles in therapeutic agent solution can be added into a vial and freeze-dried. During the freeze-drying process, the therapeutic agent can coat the interior regions of the particles, as well as the surfaces of the particles. In certain embodiments, therapeutic agent that does not become incorporated into the particles can crystallize on the interior surface of the vial. Later, the particles can be reconstituted (e.g., by adding sterile normal saline (0.9 percent) and/or contrast agent into the vial). The reconstitution of the particles can also result in reconstitution of the freeze-dried therapeutic agent, so that a mixture including the particles suspended in a therapeutic agent solution is formed.

As another example, in some embodiments, a particle having one or more cavities and/or pores can include one or more therapeutic agents (e.g. freeze-dried therapeutic agents) that can solubilize when, for example, water and/or body fluids contact the therapeutic agents after crossing into the cavities and/or pores.

As a further example, in some embodiments, a particle (e.g., a particle including a polymer including vinyl formal monomer units) can erode. For example, in certain embodiments, a particle can erode as the result of contact with water and/or body fluids within a body of a subject. As the water and/or body fluids erode the particle, they can cause channels to form in the particle. The result can be that therapeutic agent (e.g., dried therapeutic agent) that was incorporated into the particle can elute from the particle via the channels.

As an additional example, in certain embodiments, a particle may not include any therapeutic agents. In some embodiments, a particle that does not include any therapeutic agents can be freeze-dried (e.g., for storage).

As a further example, while certain methods of making particles have been described, in some embodiments, other methods can be used to make particles. For example, in some embodiments (e.g., some embodiments in which particles having a maximum dimension of less than one micron are being formed), particles can be formed using rotor/stator technology (e.g., Polytron® rotor/stator technology from Kinmatica Inc.), high-pressure homogenization (e.g., using an APV-Gaulin microfluidizer or Gaulin homogenizer), mechanical shear (e.g., using a Gifford Wood colloid mill), and/or ultrasonification (e.g., using either a probe or a flow-through cell).

As another example, in some embodiments, particles including a polymer having vinyl formal monomer units can be modified by attaching targeting residues to the surfaces of the particles. In certain embodiments, the targeting residues can be selected to target tumor tissue. This can, for example, cause the particles to embolize a site that is relatively close to a targeted tumor. In some embodiments, the use of targeting residues on the surfaces of the particles can enhance the ability of the particles to release one or more therapeutic agents at a specific target site. In certain embodiments, the targeting residues can provide a therapeutic function. For example, in some embodiments, an anti-VEGF antibody can be attached to the particles (e.g., by surface modification of the particles and/or by inclusion of the anti-VEGF antibody into the backbone of the polymer including vinyl formal monomer units). The result can be that the particles can provide an embolic and/or chemotherapeutic function, while also blocking receptors for angiogenesis.

A surface-modified particle can be formed, for example, by using both a polymer including vinyl formal monomer units, and another polymer (e.g., chitosan, alginate) that is co-soluble with the polymer including vinyl formal monomer units, in a particle formation process. For example, a chitosan solution can be formed by adding chitosan into acetic acid. In some embodiments, the chitosan solution can have a chitosan concentration of from 0.5 milligrams/milliliter to five milligrams/milliliter. The chitosan solution can then be added into a solution including DMF and a polymer including vinyl formal monomer units to form a third solution. Thereafter, drops of the third solution can be added into an aqueous surfactant solution to form particles, and/or can be used to form particles including one or more gels by being contacted with divalent anions and/or polyvalent anions. For example, in certain embodiments, drops of the third solution can be contacted with sodium sulfate, tripolyphosphate (TPP), and/or calcium chloride. The resulting particles can include chitosan. In some embodiments, the chitosan in the particles can be modified. As an example, in certain embodiments, adhesion molecules can be attached to the particles. The presence of the adhesion molecules can, for example, enhance the embolic effect of the particles. In some embodiments, the particles can be surface-modified by attaching targeting moieties (e.g., sugar residues such as galactose and/or cell adhesion molecules such as lectins) to the chitosan in the particles. The presence of targeting moieties such as sialic residues and/or galactose residues (e.g., on the surfaces of the particles) can, for example, allow the particles to specifically target tumors at the molecular level. In certain embodiments, the particles can be surface-modified by being reacted in a bath including lactobionic acid in the presence of ethyl cabodiimide hydrochloride (EDC) in N,N,N',N'-tetramethylethylenediamine (TEMED). The result can be that surface amino groups of the chitosan react to form galactosylated chitosan residues. In some embodiments, pre-made galactosylated chitosan can be used in the particle formation process to result in the formation of particles including galactosylated chitosan.

In some embodiments, the chitosan in the particles, which is positively charged, can bind to negatively charged moieties, such as anionic drugs (e.g., chemotherapeutic agents such as methotrexate and/or irinotecan).

As a further example, in some embodiments, a particle can have a region formed of a polymer including a certain weight percent of vinyl formal monomer units, and another region formed of a polymer including a higher or lower weight percent of vinyl formal monomer units. For example, a particle can include a surface region formed of a polymer including 75 percent by weight vinyl formal monomer units, and an interior region formed of a polymer including 80 percent by weight vinyl formal monomer units. The particle can be formed, for example, using a concentric nozzle, such as a concentric nozzle described above. To form the particle, the polymer including 80 percent by weight vinyl formal monomer units can be flowed through an inner nozzle of the concentric nozzle, and the polymer including 75 percent by weight vinyl formal monomer units can be flowed through an outer nozzle of the concentric nozzle.

As an additional example, in certain embodiments, a particle including a polymer including vinyl formal monomer units can also include one or more other polymers. For example, a particle including a polymer including vinyl formal monomer units can also include one or more pores and/or cavities that are filled with one or more other polymers (e.g., compounded with one or more therapeutic agents). Examples of polymers include polyvinyl alcohols, polyacrylic acids, polymethacrylic acids, poly vinyl sulfonates, carboxymethyl celluloses, hydroxyethyl celluloses, substituted celluloses, polyacrylamides, polyethylene glycols, polyamides, polyureas, polyurethanes, polyesters, polyethers, polystyrenes, polysaccharides, polylactic acids, polyethylenes, polymethylmethacrylates, polycaprolactones, polyglycolic acids, poly(lactic-co-glycolic) acids (e.g., poly(d-lactic-co-glycolic) acids) and copolymers or mixtures thereof. Polymers are described, for example, in Lanphere et al., U.S. Patent Application Publication No. US 2004/0096662 A1, published on May 20, 2004, and entitled "Embolization"; Song et al., U.S. patent application Ser. No. 11/314,056, filed on Dec. 21, 2005, and entitled "Block Copolymer Particles"; and Song et al., U.S. patent application Ser. No. 11/314,557, filed on Dec. 21, 2005, and entitled "Block Copolymer Particles", all of which are incorporated herein by reference.

As another example, in some embodiments, a porous particle can have a substantially uniform pore structure. Alternatively, a porous particle can have a non-uniform pore structure. For example, a particle can have a substantially non-porous interior region and a porous exterior region. Porous particles are described, for example, in Lanphere et al., U.S. Patent Application Publication No. US 2004/0096662 A1, published on May 20, 2004, and entitled "Embolization", and in Song, U.S. patent application Ser.

No. 11/355,301, filed on Feb. 15, 2006, and entitled "Block Copolymer Particles", both of which are incorporated herein by reference.

As an additional example, while the use of a gelling precursor to form porous particles has been described, in some embodiments, one or more water-soluble polymers can be used to form porous particles. For example, during a drop generation process that is used to form particles including a polymer including vinyl formal monomer units, pores can be formed in the particles by adding at least one water-soluble polymer into the solution that is used to form the drops. Particles formed from the drops can include the water-soluble polymer incorporated into a matrix formed of the polymer including vinyl formal monomer units. To remove the water-soluble polymer from the particles, the particles can be contacted with water. The water can dissolve the water-soluble polymer within the particles, thereby forming pores. Examples of water-soluble polymers include polyethylene glycol, polyvinylpyrrolidone, carboxymethylcellulose, and hydroxyethylcellulose.

As a further example, in some embodiments, a solution can be added to the nozzle of a drop generator to enhance the porosity of particles produced by the drop generator. Examples of porosity-enhancing solutions include starch, sodium chloride at a relatively high concentration (e.g., more than 0.9 percent, from one percent to five percent, from one percent to two percent), and calcium chloride (e.g., at a concentration of at least 50 mM).

As another example, in some embodiments, a particle that includes relatively few pores or no pores and that erodes during use can form fewer pores during erosion than a particle that includes a relatively high number of pores. The result can be that the particle including relatively few pores releases therapeutic agent at a slower rate than the particle including a relatively high number of pores.

As an additional example, in certain embodiments, a particle can have a non-porous surface that renders the particle substantially impermeable to water and/or other fluids. As a result, water and/or other fluids within the particle can remain trapped within the particle (e.g., until the particle is broken, allowing its contents to spill out). The permeability of a particle to water can be tested by drying the surface water from a quantity of particles, and observing any changes in the mass of the particles using Thermogravimetric Analysis (TGA).

Figure 11A:
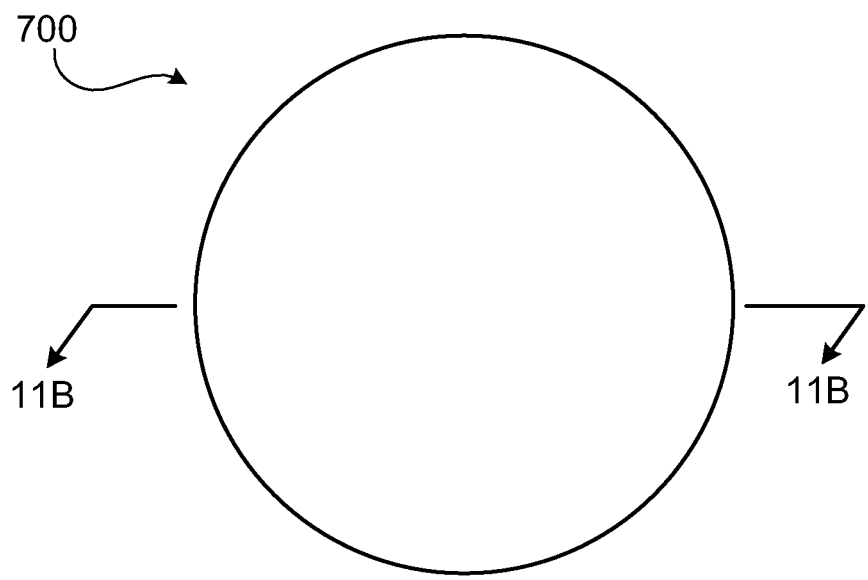
FIG. 11A is a side view of an embodiment of a particle.
Figure 11B:
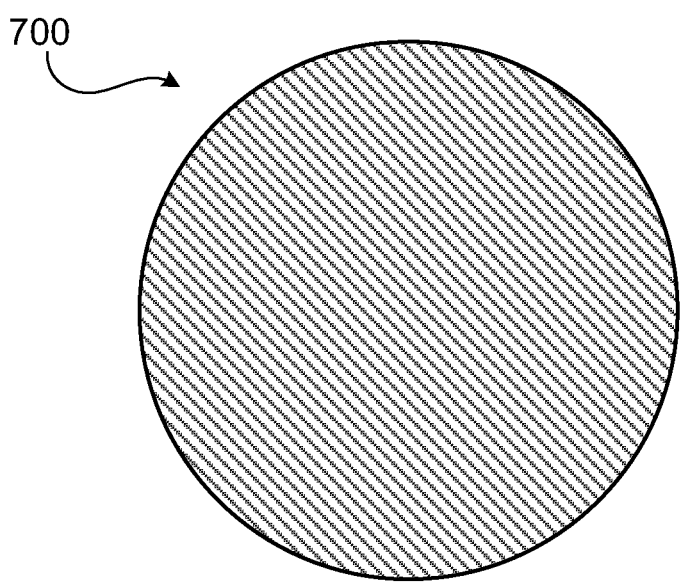
FIG. 11B is a cross-sectional view of the particle of FIG. 11A, taken along line 11B-11B.

As a further example, in some embodiments, a particle may not include any pores, and/or may not include any cavities. For example, FIGS. 11A and 11B show a particle 700 that is formed of a polymer including vinyl formal monomer units, and that does not include any pores or cavities.

In certain embodiments, a particle such as particle 700 can be formed as follows. First, a polymer solution is formed by combining a solvent, a polymer including vinyl formal monomer units, and another polymer having a different solubility in the solvent from the polymer including vinyl formal monomer units. Then, drops of the polymer solution are formed and are contacted with an aqueous solution including a surfactant. The drops are mixed in the aqueous solution to form a suspension including particles suspended in the solvent. The solvent is then removed from the suspension to provide the particles. The difference in the solubilities of the polymers can cause the particles to have no pores and/or cavities.

In some embodiments, a particle such as particle 700 can be formed by using a polymer including vinyl formal monomer units in a particle formation process to form particles including pores and/or cavities, and then closing the pores and/or cavities by partially solvating the polymer in the particles over a selected period of time.

As another example, in certain embodiments, relatively small particles (e.g., particles having a maximum dimension of less than 100 microns) including a polymer including vinyl formal monomer units can be formed by combining a solution including the polymer with an aqueous solution to form a mixture, and homogenizing the mixture (e.g., using a PowerGen Models 700D homogenizer from Fisher Scientific). In some embodiments, the mixture can be homogenized at a speed of at least 90 revolutions per minute (e.g., at least 100 revolutions per minute, at least 250 revolutions per minute) and/or at most 500 revolutions per minute (e.g., at most 250 revolutions per minute, at most 100 revolutions per minute). After the mixture has been homogenized, the resulting particles can be removed from the mixture by, for example, filtration.

As a further example, while homogenization has been described as a form of mixing that can be used in a particle formation process, in some embodiments, vortexing or sonication can be used as an alternative to, or in addition to, homogenization.

As an additional example, in some embodiments, a particle that includes a polymer having vinyl formal monomer units can also include a shape memory material, which is capable of being configured to remember (e.g., to change to) a predetermined configuration or shape. In certain embodiments, particles that include a shape memory material can be selectively transitioned from a first state to a second state. For example, a heating device provided in the interior of a delivery catheter can be used to cause a particle including a shape memory material to transition from a first state to a second state. Shape memory materials and particles including shape memory materials are described in, for example, Bell et al., U.S. Patent Application Publication No. US 2004/0091543 A1, published on May 13, 2004, and entitled "Embolic Compositions", and DiCarlo et al., U.S. Patent Application Publication No. US 2005/0095428 A1, published on May 5, 2005, and entitled "Embolic Compositions", both of which are incorporated herein by reference.

As another example, in some embodiments, a particle that includes a polymer including vinyl formal monomer units can also include a surface preferential material. Surface preferential materials are described, for example, in DiCarlo et al., U.S. Patent Application Publication No. US 2005/0196449 A1, published on Sep. 8, 2005, and entitled "Embolization", which is incorporated herein by reference.

As a further example, in certain embodiments, particles can be linked together to form particle chains. For example, the particles can be connected to each other by links that are formed of one or more of the same material(s) as the particles, or of one or more different material(s) from the particles. Particle chains and methods of making particle chains are described, for example, in Buiser et al., U.S. Patent Application Publication No. US 2005/0238870 A1, published on Oct. 27, 2005, and entitled "Embolization", which is incorporated herein by reference.

As an additional example, in some embodiments, one or more particles is/are substantially nonspherical. In certain embodiments, particles can be mechanically shaped during or after the particle formation process to be nonspherical (e.g., ellipsoidal). In some embodiments, particles can be shaped (e.g., molded, compressed, punched, and/or agglomerated with other particles) at different points in the particle manufacturing process. As an example, in some embodiments in which particles include a polymer including vinyl formal monomer units, the particles can be sufficiently flexible and/or moldable to be shaped. While substantially spherical particles have been described, in certain embodiments, nonspherical particles can be manufactured and formed by controlling, for example, drop formation conditions. In some embodiments, nonspherical particles can be formed by post-processing the particles (e.g., by cutting or dicing into other shapes). Particle shaping is described, for example, in Baldwin et al., U.S. Patent Application Publication No. US 2003/0203985 A1, published on Oct. 30, 2003, and entitled "Forming a Chemically Cross-Linked Particle of a Desired Shape and Maximum dimension", which is incorporated herein by reference.

As another example, in certain embodiments, a particle can be coated with a coating that makes the particle more rigid, and/or that enhances the biocompatibility of the particle.

As a further example, in some embodiments, particles can be used for tissue bulking. As an example, the particles can be placed (e.g., injected) into tissue adjacent to a body passageway. The particles can narrow the passageway, thereby providing bulk and allowing the tissue to constrict the passageway more easily. The particles can be placed in the tissue according to a number of different methods, for example, percutaneously, laparoscopically, and/or through a catheter. In certain embodiments, a cavity can be formed in the tissue, and the particles can be placed in the cavity. Particle tissue bulking can be used to treat, for example, intrinsic sphincteric deficiency (ISD), vesicoureteral reflux, gastroesophageal reflux disease (GERD), and/or vocal cord paralysis (e.g., to restore glottic competence in cases of paralytic dysphonia). In some embodiments, particle tissue bulking can be used to treat urinary incontinence and/or fecal incontinence. The particles can be used as a graft material or a filler to fill and/or to smooth out soft tissue defects, such as for reconstructive or cosmetic applications (e.g., surgery). Examples of soft tissue defect applications include cleft lips, scars (e.g., depressed scars from chicken pox or acne scars), indentations resulting from liposuction, wrinkles (e.g., glabella frown wrinkles), and soft tissue augmentation of thin lips. Tissue bulking is described, for example, in Bourne et al., U.S. Patent Application Publication No. US 2003/0233150 A1, published on Dec. 18, 2003, and entitled "Tissue Treatment", which is incorporated herein by reference.

As another example, in some embodiments, a particle can include a coating including collagen. A collagen-coated particle can be used, for example, in a tissue-bulking procedure, such as one or more of the tissue bulking procedures described above.

As a further example, in certain embodiments, particles can be used to treat trauma and/or to fill wounds. In some embodiments, the particles can include one or more bactericidal agents and/or bacteriostatic agents, such as antibiotics.

As an additional example, in some embodiments, particles can be used in an ablation procedure (e.g., a tissue ablation procedure). For example, the particles may include one or more ferromagnetic materials and may be used to enhance ablation at a target site. Ablation is described, for example, in Rioux et al., U.S. Patent Application Publication No. US 2004/0101564 A1, published on May 27, 2004, and entitled "Embolization"; Lanphere et al. U.S. Patent Application Publication No. US 2005/0129775 A1, published on Jun. 16, 2005, and entitled "Ferromagnetic Particles and Methods"; and Lanphere et al., U.S. patent application Ser. No. 11/117, 156, filed on Apr. 28, 2005, and entitled "Tissue-Treatment Methods", all of which are incorporated herein by reference.

As another example, while compositions including particles suspended in at least one carrier fluid have been described, in certain embodiments, particles may not be suspended in any carrier fluid. For example, particles alone can be contained within a syringe, and can be injected from the syringe into tissue during a tissue ablation procedure and/or a tissue bulking procedure.

As an additional example, in some embodiments, particles having different shapes, sizes, physical properties, and/or chemical properties can be used together in a procedure (e.g., an embolization procedure). The different particles can be delivered into the body of a subject in a predetermined sequence or simultaneously. In certain embodiments, mixtures of different particles can be delivered using a multi-lumen catheter and/or syringe. In some embodiments, particles having different shapes and/or sizes can be capable of interacting synergistically (e.g., by engaging or interlocking) to form a well-packed occlusion, thereby enhancing embolization. Particles with different shapes, sizes, physical properties, and/or chemical properties, and methods of embolization using such particles are described, for example, in Bell et al., U.S. Patent Application Publication No. US 2004/0091543 A1, published on May 13, 2004, and entitled "Embolic Compositions", and in DiCarlo et al., U.S. Patent Application Publication No. US 2005/0095428 A1, published on May 5, 2005, and entitled "Embolic Compositions", both of which are incorporated herein by reference.

As a further example, in some embodiments in which a particle including a polymer including vinyl formal monomer units is used for embolization, the particle can also include (e.g., encapsulate) one or more embolic agents, such as a sclerosing agent (e.g., ethanol), a liquid embolic agent (e.g., n-butyl-cyanoacrylate), and/or a fibrin agent. The other embolic agent(s) can enhance the restriction of blood flow at a target site.

As another example, in some embodiments, a treatment site can be occluded by using particles in conjunction with other occlusive devices. For example, particles can be used in conjunction with coils. Coils are described, for example, in Elliott et al., U.S. patent application Ser. No. 11/000,741, filed on Dec. 1, 2004, and entitled "Embolic Coils", and in Buiser et al., U.S. patent application Ser. No. 11/311,617, filed on Dec. 19, 2005, and entitled "Coils", both of which are incorporated herein by reference. In certain embodiments, particles can be used in conjunction with one or more gels. Gels are described, for example, in Richard et al., U.S. Patent Application Publication No. US 2006/0045900 A1, published on Mar. 2, 2006, and entitled "Embolization", which is incorporated herein by reference. Additional examples of materials that can be used in conjunction with particles to treat a target site in a body of a subject include gel foams (e.g., gelatin-based gel foams), glues (e.g., cyanoacrylate glues), oils (e.g., ethiodol, lipiodol), and alcohol (e.g., ethanol).

As a further example, while particles including a polymer including vinyl formal monomer units have been described, in some embodiments, other types of medical devices and/or therapeutic agent delivery devices can include a polymer including vinyl formal monomer units. For example, in some embodiments, a coil can include a polymer including vinyl formal monomer units. In certain embodiments, the coil can be formed by flowing a stream of the polymer into an aqueous solution, and stopping the flow of the polymer stream once a coil of the desired length has been formed. Coils are described, for example, in Elliott et al., U.S. patent application Ser. No. 11/000,741, filed on Dec. 1, 2004, and entitled "Embolic Coils", and in Buiser et al., U.S. patent application Ser. No. 11/311,617, filed on Dec. 19, 2005, and entitled "Coils", both of which are incorporated herein by reference. In certain embodiments, sponges (e.g., for use as a hemostatic agent and/or in reducing trauma) can include a polymer including vinyl formal monomer units. In some embodiments, coils and/or sponges can be used as bulking agents and/or tissue support agents in reconstructive surgeries (e.g., to treat trauma and/or congenital defects).

Other embodiments are in the claims.

The invention claimed is:

1. A particle having a maximum dimension of at least 1500 microns and comprising a first polymer comprising vinyl formal monomer units, vinyl alcohol monomer units, and vinyl acetate monomer units, wherein (a) the polymer comprises more than 75 percent by weight vinyl formal monomer units, (b) the polymer comprises the from 9.5 percent by weight to 13.0 percent by weight vinyl acetate monomer units and (c) the particle includes at least one cavity having a maximum dimension of from 50 microns to 1,000 microns, wherein the cavity is surrounded by a matrix that includes pores, wherein at least some of the pores are not open to the surface of the particle.

2. The particle of claim 1, wherein the first polymer comprises at least 76 percent by weight vinyl formal monomer units.

3. The particle of claim 1, wherein the first polymer comprises at least 77 percent by weight vinyl formal monomer units.

4. The particle of claim 1, wherein the first polymer comprises at least 78 percent by weight vinyl formal monomer units.

5. The particle of claim 1, wherein the first polymer comprises at most 85 percent by weight vinyl formal monomer units.

6. The particle of claim 1, wherein the first polymer comprises at most 81 percent by weight vinyl formal monomer.

7. The particle of claim 1, wherein the pores have a maximum dimension of from 0.01 micron to one micron.

8. The particle of claim 1, wherein the matrix comprises the first polymer.

9. The particle of claim 1, wherein the matrix has a non-porous surface region.

10. The particle of claim 1, wherein the particle further comprises a second polymer that is different from the first polymer.

11. The particle of claim 10, wherein the second polymer comprises vinyl formal monomer units.

12. The particle of claim 10, wherein the particle further comprises at least one therapeutic agent that is combined with the second polymer.

* * * * *